(12) United States Patent
Wenzel

(10) Patent No.: US 9,072,227 B2
(45) Date of Patent: Jul. 7, 2015

(54) SYSTEM AND METHOD FOR IMPROVEMENT OF HARVEST WITH CROP STORAGE IN GRAIN BAGS

(75) Inventor: Craig Edward Wenzel, Mahomet, IL (US)

(73) Assignee: DEERE & COMPANY, Moline, IL (US)

( * ) Notice: Subject to any disclaimer, the term of this patent is extended or adjusted under 35 U.S.C. 154(b) by 1252 days.

(21) Appl. No.: 12/900,734

(22) Filed: Oct. 8, 2010

(65) Prior Publication Data

US 2012/0087771 A1    Apr. 12, 2012

(51) Int. Cl.
*A01F 12/50* (2006.01)
*A01F 12/60* (2006.01)

(52) U.S. Cl.
CPC .............. *A01F 12/60* (2013.01); *A01F 12/50* (2013.01)

(58) Field of Classification Search
USPC ................. 701/50, 99; 414/240, 809, 222.01; 460/114, 119, 5–7
See application file for complete search history.

(56) References Cited

U.S. PATENT DOCUMENTS

| | | | | |
|---|---|---|---|---|
| 5,724,793 | A * | 3/1998 | Inman et al. | 53/576 |
| 5,795,222 | A * | 8/1998 | McLeod | 460/97 |
| 6,938,960 | B1 * | 9/2005 | Eby | 298/23 C |
| 2012/0240530 | A1 * | 9/2012 | Martinez | 53/567 |

OTHER PUBLICATIONS

"Demco grain card", Demco Agricultural Products, retrieved Aug. 12, 2010, pp. 1-4 demco-products.com/.../750cart.html.

* cited by examiner

*Primary Examiner* — Helal A Algahaim
*Assistant Examiner* — Nga X Nguyen
(74) *Attorney, Agent, or Firm* — Yee & Associates, P.C.

(57) ABSTRACT

A method for the debottlenecking of grain harvesting and grain bagging comprises a set of steps. Grain is transported in a grain cart from a harvester at a harvesting location to an accumulation site. Grain is bulk unloaded crop from the grain cart at an accumulation site by, for example, gravity dumping through a rear door of the grain cart. The cart returns to the harvester; and the grain at the accumulation site is transferred into a silo storage bag. The steps of transporting the grain, bulk unloading the grain, and returning the cart comprise a first process. The step of transferring the grain from the accumulation site into a bag comprises a second process. The first process and second process proceed in parallel.

14 Claims, 13 Drawing Sheets

SYSTEM AND METHOD FOR IMPROVEMENT OF HARVEST WITH CROP STORAGE IN GRAIN BAGS

FIELD OF THE INVENTION

The present invention relates generally to harvesting of crops. More particularly, the invention relates to harvesting related processes such as grain cart cycling, grain unloading, grain storage, and grain bagging.

BACKGROUND OF THE INVENTION

An increasing trend towards developing automated or semi-automated equipment is present in today's work environment. In some situations with this trend, the equipment is completely different from the operator-controlled equipment that is being replaced, and does not allow for any situations in which an operator can be present or take over operation of the vehicle. Such unmanned equipment can have cost and performance challenges due to the complexity of systems involved, the current status of computerized control, and uncertainty in various operating environments. As a result, semi-automated equipment is more commonly used. This type of equipment is similar to previous operator-controlled equipment, but incorporates one or more operations that are automated rather than operator-controlled. This semi-automated equipment allows for human supervision and allows the operator to take control in different situations when necessary.

SUMMARY

In an illustrative embodiment, a method for managing the movement and storage of grain includes the unloading of grain in bulk. More particularly, the method includes the steps of transporting grain from a harvesting location to an accumulation site; bulk unloading grain from a grain cart at the accumulation site; returning the grain cart to the harvesting location; and transferring the grain from the accumulation site into a grain bag. The transporting, bulk unloading, and returning is a first process, and the transferring the grain from the grain accumulation site into a grain bag is a second process. The first process and the second process may proceed in parallel. The bulk unloading grain further includes gravity dumping of grain from the grain cart such as dumping from the bottom, side, and rear of the grain cart. Further, the bulk unloading grain may place the grain on the ground, above the ground, or below the ground. A liner and other grain storage equipment may be used at the accumulation site such as, for example, a storage bin, a mobile storage bin, a hopper, a bulk grain truck, and a bulk grain rail car. A pile of grain on the ground is one example of an accumulation site. Additionally, the transferring of grain into the grain cart from the grain harvester may utilize grain transfer equipments such as an auger positioned in the harvester. The grain cart need not include an auger and the related auger hydraulics.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DETAILED DESCRIPTION

Figure 1:
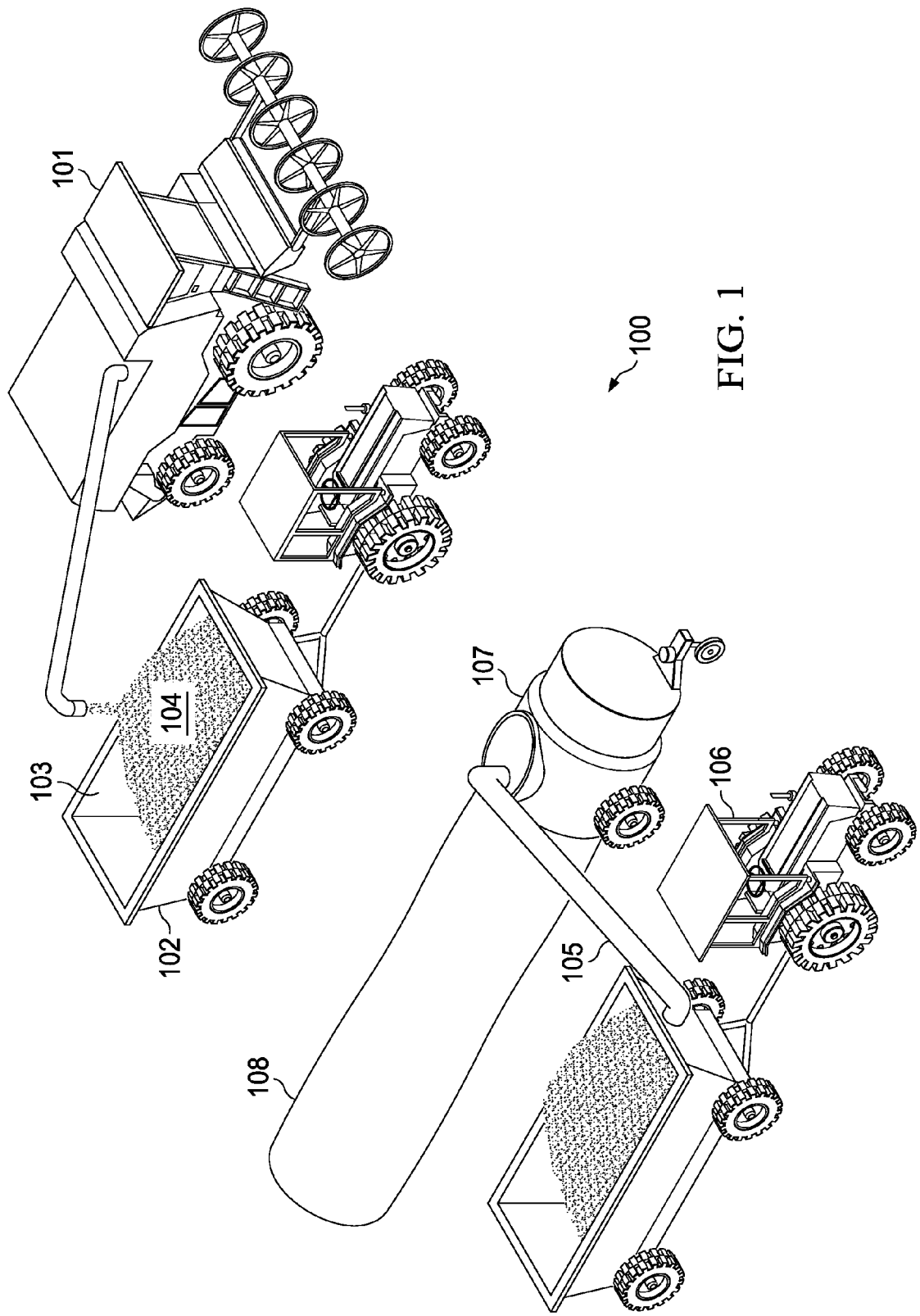
FIG. 1 is a perspective view of a harvesting operation including an intelligent grain bagger in accordance with an illustrative embodiment.

The different illustrative embodiments recognize and take into account a number of different considerations. For example, the illustrative embodiments recognize and take into account that during crop harvesting, crop material is harvested and processed by a combine harvester. As the crop material is harvested, it is carried in an onboard grain tank integral to the harvester. As the grain tank becomes full, the grain may be unloaded into a grain cart. When the amount of grain in the grain cart approaches the capacity of the grain cart, the cart leaves the combine and transports the grain to a storage location, unloads the grain into a storage medium such as a grain bag, by means of an auger integral to the grain cart. When the grain unloading is completed, the grain cart returns to the combine harvester to receive more grain from the harvester.

Further, the different illustrative embodiments recognize and take into account that the time required by the grain cart to complete its cycle is important to the field efficiency of the combine harvester. If the grain cart, or grain carts, cannot complete this cycle before the combine grain tank is full again, the combine must stop and wait for the grain cart to return. This unproductive time may negatively impact the efficiency of the harvest operation and result in lost revenue. Field efficiency is especially important when the harvest time window is short.

Also, the different illustrative embodiments recognize and take into account that when plastic silo bags are used to store grain, as is often done in South American countries for example, the bags are often placed in a location that may be quite distant from the field where the combine harvester is operating. The bags are large and not portable. The time required for transporting the grain to a storage location, unloading the grain, and returning to the combine harvester can be quite long. This kind of schedule then results in a prolonged cycle time which also leads to field inefficiency, lost revenue, or it may drive the need for additional capital expense in the form of additional grain carts. Conversely, shortened grain cart cycle time can improve field efficiency, productivity, and revenue.

Thus, in one aspect, the different illustrative embodiments recognize that it would be desired to minimize grain cart cycle time in order to decrease equipment needs and increase the efficiency of the overall harvesting and storage operation.

The illustrative embodiments also recognize and take into account further considerations. For example, the illustrative embodiments recognize and take into account that a grain bagger may load grain into a grain bag. The grain bag is attached to the grain bagger and is initially in an unexpanded configuration. In this configuration, the grain bag may be compacted or folded. The different illustrative embodiments recognize and take into account that filling the grain bag causes the grain bag to expand on grain bagger. The filled portion of the grain bag may then move off of the grain bagger and rest on the ground.

The illustrative embodiments recognize and take into account that stretching and expansion of the grain bag exerts a force on the grain bagger. This force causes the grain bagger to move forward away from the grain bag as the grain bag unfolds.

The illustrative embodiments also recognize and take into account that it is desirable to fill the grain bag to as full as possible. This operation may cause the grain bagger to move forward farther or faster than desired. The movement of the grain bagger may be controlled by applying a braking force on the wheels of grain bagger. The illustrative embodiments recognize and take into account that care is needed to avoid braking the grain bagger in a manner that causes the grain bag to stretch in an undesired manner.

The illustrative embodiments recognize and take into account that braking force applied to the grain bagger is performed by an operator that observes the stretching of the grain bag and manually adjusts braking of wheels accordingly. If the bag is understretched, the braking force is increased. If the bag is overstretched, the braking force is lessened.

The illustrative embodiments recognize and take into account that the measurement of grain bag stretch has been a measurement of the distance between stretch marks printed on, or otherwise applied to, the surface of a grain bag. Once filled, the grain bag is closed, detached from the grain bagger, and the grain bag remains resting on the ground until access of the stored grain therein is desired.

The illustrative embodiments recognize and take into account that currently with operators manually observing the stretching of the bag and manually applying braking force, the forward movement of the grain bagger is rarely even or smooth, and is often plagued by uneven velocity changes. The illustrative embodiments recognize and take into account that this situation may be problematical in properly placing grain into the bag.

For example, an auger and hopper may be used in placing grain into the bag. Alignment of the auger with the hopper opening leading to the bag should be maintained. The illustrative embodiments recognize and take into account that this type of alignment may not be as precise as desired with human operators controlling the braking of the grain bagger. As a result, some grain may not reach the grain bag and may fall on the ground.

Also, the illustrative embodiments recognize and take into account that the current process of controlling a grain bagger includes the operation in which one operator may monitor the stretching of the grain bag and apply braking force to the grain bagger. In these examples, each of the two wheels of the grain bagger is independently braked. This arrangement means that the operator runs from side to side of the grain bagger to apply braking force independently to each of the two wheels. Further, the current manual process necessitates more than one operator to attend and manage the various items of equipment; additionally, more than one tractor is required with current equipment designs.

Thus, the illustrative embodiments provide a method and apparatus for loading grain. In one illustrative embodiment, an automated mobile grain bagger for loading grain into a bag includes a wheeled vehicle frame, a bag attachment, a hopper, a grain distributor, a prime mover, a braking system, a steering system, a controller, a braking control system, and a steering control system. The bag attachment is disposed on the frame, and the bag attachment is configured to receive attachment of a grain bag. The hopper is disposed on the vehicle, and the hopper is configured to receive grain. The grain distributor is connected to the hopper and is configured to transfer grain from the hopper to the grain bag thereby filling the bag, stretching the bag, and propelling the grain bagger. The prime mover, such as an engine, is configured to provide power to the grain distributor. A braking system and a steering system are linked to a controller. The controller is configured to control the braking system and the steering system. The braking control system comprises a sensor configured to provide bag stretch information to the controller, and the controller is further configured to provide braking commands to the grain bagger braking system. The steering control system comprises a course sensor configured to provide course information to the controller, and the controller is further configured to provide steering commands to the grain bagger steering system.

Still further, the illustrative embodiments provide a method for managing the movement and storage of grain which includes the bulk unloading of grain. More particularly, the method includes the steps of transporting grain from a harvesting location to an accumulation site, bulk unloading grain from a grain cart at the accumulation site, returning the grain cart to the harvesting location, and transferring the grain from the accumulation site into a grain bag. The transporting, bulk unloading, and returning comprise a first process, and the transferring the grain from the grain accumulation site into a grain bag comprises a second process. The first process and the second process may proceed in parallel. Parallel processing thus allows for increased efficiency and reduced capital cost of equipment.

With reference now to the figures, and in particular, with reference to FIG. 1, a perspective view of vehicles in an operating environment is depicted in accordance with an illustrative embodiment. In this illustrative example, operating environment 100 may be any type of work-site with vegetation that can be harvested.

In this illustrative example, a grain loading operating environment 100 includes several kinds of machines, vehicles, and equipment. A harvester 101 operates so as to harvest vegetation. The vegetation may be, for example, legumes, cereals, grains, soybeans, corn, wheat, barley, milo, sorghum, millet, and rye.

As depicted, grain cart 102 operates in conjunction with harvester 101. During operation, grain cart 102 receives grain from harvester 101 into a bin 103 within grain cart 102. An auger 105, or similar transfer device, transfers grain from harvester 101 into grain cart 102. Auger 105 may be attached to harvester 101, to grain cart 102, or in other embodiments, may be disposed as an autonomous item of equipment.

Grain cart 102 is a mobile vehicle and serves in one capacity to transfer grain 104 from the area of the harvester 101 to an area where the grain 104 may be placed into storage. Tractor 106 may be attached to grain cart 102 and pull grain cart 102. Further tractor 106 may supply grain cart 102 with mechanical and hydraulic power via the power take off (PTO) attachments on tractor 106 that are connected to the tractor hydraulic system. A grain bagger 107 transfers grain from grain cart 102 into a grain bag 108. Grain bagger 107 is also referred to as a grain bagging unit. Though perhaps used more frequently in countries other than the United States, grain bag 108 may be broadly described as a large, sausage-shaped bag which receives grain for storage. When full, grain bag 108 may be several dozens of feet in length in an expanded state and typically rests on the ground.

In general, FIG. 1 displays a static representation of a dynamic process. Harvester 101 moves through crops and harvests crops, such as grain 104 therefrom. A temporary storage bin within harvester 101 fills with grain 104 during harvesting. Grain cart 102 moves alongside harvester 101 and receives grain 104 from the harvester storage bin into the grain cart's bin 103. Grain cart 102 may be pulled by tractor 106 to move into the desired position. When filled to a desired level, grain cart 102 then moves away from harvester 101 and moves proximate to grain bagger 107. Depending on the size of the field to be harvested, or the yield of the crop therein, a number of items of equipment may be used. Thus, multiple harvesters 101 may be utilized. Multiple grain carts 102 and tractors 106 may be in service. Further, multiple grain baggers 107 may be operating.

Figure 2:
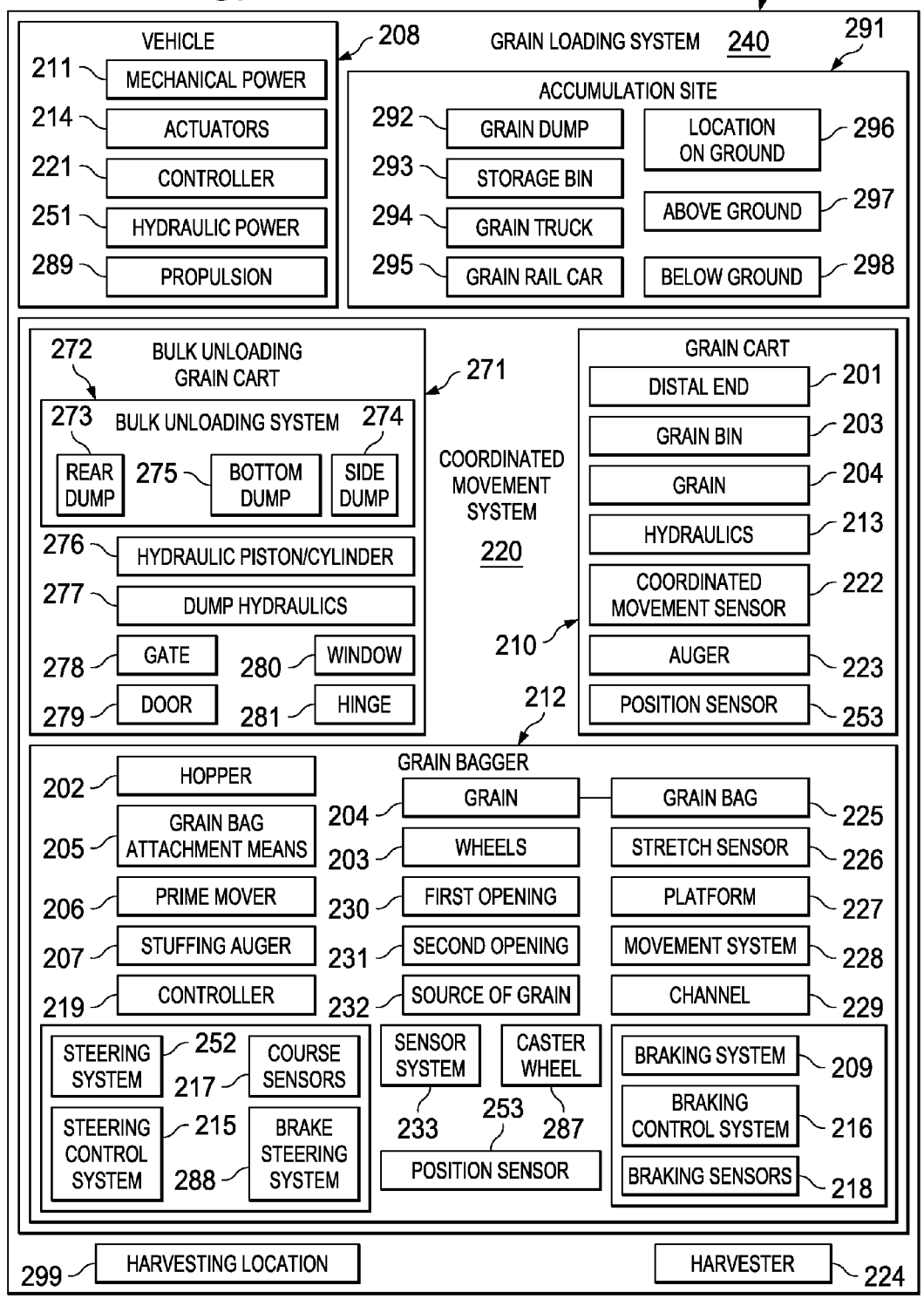
FIG. 2 is a block diagram of a system for controlling and loading grain in a bag in accordance with an illustrative embodiment.

With reference now to FIG. 2, a block diagram of a grain loading environment is depicted in accordance with an illustrative embodiment. In this depicted example, grain loading environment 100 in FIG. 1 is an illustration of one implementation for grain loading environment 200.

In this illustrative example, grain loading system 240 is an example of a system that may be used to load grain 204 into grain bag 225. Grain loading system 240 may comprise multiple components. For example, grain loading system 240 may include vehicle 208, grain cart 210, harvester 224, and grain bagger 212.

Additionally, grain loading system 240 may provide a system in which two processes occur simultaneously. One process includes harvesting with harvester 224 including the transport of a crop product such as grain from a harvesting location 299 to an accumulation site 291. A bulk unloading grain cart 271 may be used to transport the grain. Bulk unloading grain cart 271 can quickly unload grain in bulk; the bulk unloading grain cart 271 can bulk unload its grain load at accumulation site 291. Also included in the first process is the return of bulk unloading grain cart 271 from accumulation site 291 to the harvesting location 299 of harvester 224 where bulk unloading grain cart 271 can pick up another load of grain. In a second process, which may occur simultaneously with the first process, a grain bagger 212 may receive the unloaded grain that had been placed at the accumulation site 291 and load that grain into a grain bag 225. The second process, grain bagging, may also include a vehicle 208 such as a tractor and a grain cart 210. The second process may also proceed as a partially automated process. As further explained herein, grain cart 210 and bulk unloading grain cart 271 may have equipment and configuration differences.

The simultaneous processing described above advantageously reduces bottlenecks and increases efficiency with respect to grain harvesting and bagging. By decoupling the grain bagging process into a separate operation which occurs in parallel with other processes, equipment is freed up to participate in other processes such as receiving grain from harvester 224 and transporting grain to the accumulation site 291. Further, the increased efficiency obtained through simultaneous processing decreases the need for extra capital equipment such as extra grain carts of any kind.

Continuing now with a further description of equipment included in grain loading system 240, vehicle 208 is any vehicle that is configured to pull grain cart 210. In this particular example, vehicle 208 may be a tractor. In an illustrative embodiment, tractor 208 is connected with grain cart 210 and provides mechanical power 211 and hydraulic power 251 to grain cart 210. Mechanical power 211 may be provided through the tractor's power take off, and hydraulic power 251 may be provided through the tractor's hydraulic system. Tractor 208 also provides power for pulling and positioning the wheeled grain cart 210 in a towing configuration. Tractor 208 may also include other typical systems and items of equipment, not discussed in detail here, such as for example, an engine, transmission, and wheels or the like. Hence, tractor 208 includes propulsion 289. Tractor 208 may also include a hydraulic pump, control valves, and fluid distribution system. The tractor 208 may also include a steering and braking system along with the associated items for operator control of all these systems. Similarly, tractor 208 may include controllers and sensors necessary for the supervision and control of its systems. Tractor 208 may also provide a suitable location for an individual operator or attendant such as a tractor cab.

Grain cart 210 includes a grain bin 203. Grain bin 203 receives grain 204. In a typical operation, grain 204 from harvester 224 is deposited into grain bin 203 of grain cart 210. Grain cart 210 includes wheels so that it may be towed to a desired location. Grain cart 210 further includes an auger 223 or other form of grain transferor. Auger 223 may be connected with hydraulics 213 configured in grain cart 210 for deploying or storing auger 223. Hydraulics 213 receives hydraulic power 251 from connection with the hydraulic system of tractor 208. Auger 223 includes a distal end 201 which can be moved into a desired position as further described herein.

While the illustrative embodiment is described with tractor 208 towing grain cart 210 it will be understood by those skilled in the art that other configurations are possible. Another kind of vehicle may provide towing power to grain cart 210, or grain cart 210 may be self-powered. Additionally, grain cart 210 may receive mechanical and hydraulic power from other sources besides that of a tractor. Additionally, grain cart 210 may operate in whole or part through electrical energy and the use of electric motors.

System 200 additionally includes grain bagger 212. Grain bagger 212 may include a frame with wheels 203. Grain bagger 212 also includes an attachment means 205 to which grain bag 225 may be affixed to grain bagger 212. Grain bagger 212 may include a prime mover 206 such as an engine. Grain bagger 212 may also include a hopper 202. Hopper 202 is generally configured so as to receive grain 204 that is transferred from grain cart 210 through auger 223 and into hopper 202. Hopper 202 may further define an opening.

Grain bagger 212 is configured so as to transfer grain received in hopper 202 and load that grain into grain bag 225, such as by a pushing or stuffing of the grain through stuffing auger 207. Stuffing auger 207 may receive its power through prime mover 206. Further connections between prime mover 206 and stuffing auger 207 may include belts and pulleys, tensioners, hydraulic connections, and other forms of connection. Stretch sensor 226 detects and indicates a level of stretching of grain bag 225 as grain bag 225 expands with grain 204.

Grain bagger 212 further includes operational systems such as a steering system 252 and braking system 209. Each such system includes the actuators or effectors necessary to execute steering and braking commands.

A controller 219 may also be disposed on grain bagger 212. Optionally, controller 219 may be disposed elsewhere and still operate in conjunction with respect to grain bagger 212. Controller 219 functions so as to control various systems of grain bagger 212. In an illustrative embodiment, controller 219 is linked to, and also works in conjunction with, a steering control system 215 and braking control system 216 of grain bagger 212. Steering control system 215 operates to control steering system 252, and braking control system 216 operates to control braking system 209. Steering control system 215 and braking control system 206 also control and are in communication with actuators and effectors necessary to control steering and braking. Steering control system 215 may include course sensors 217 which provide course and steering information to controller 219. Braking control system 216 may include braking sensors 218 which provide braking information to controller 219.

Steering system 252 and steering control system 215 may also operate through a brake steering system 288. brake steering system 288 may include a caster wheel 287 or third wheel. Caster wheel 287 is configured to turn freely. Caster wheel 287 may be placed in various locations on grain bagger 212, and in one illustrative embodiment is placed in the front area of grain bagger 212 forward of wheels 203. In this manner, a braking force applied to one of paired wheels 203 provides a one-sided braking force which further comprises a steering imparted onto grain bagger 212.

Still referring to FIG. 2, system 200 also includes a coordinated movement system 220. Coordinated movement system 220 operates so as to provide coordinated movement of grain cart 210 with respect to grain bagger 212. More specifically, coordinated movement system 220 operates so as to allow auger 223 to stay in a loading position with respect to hopper 202 as both grain bagger 212 and grain cart 210 move. Coordinated movement system 220 includes controller 219 and coordinated movement sensor 222. Coordinated movement sensor 222 detects the relative position of auger 223 and hopper 202 and communicates this information to controller 221. Controller 221 generates course adjustment information and transmits it to one or more vehicles in system 200 so as to coordinate movement therein. Coordinated movement system 220 may include position sensor 253. In an illustrative embodiment position sensor 253 is shown as associated with grain cart 210 and grain bagger 212. Alternatively, position sensor 253 may be associated with only one of these items.

Still referring to FIG. 2, a further illustrative embodiment includes platform 227. Platform 227 may include a movement system 228 wherein movement system 228 is configured to control the movement of platform 227 such as by operating a steering system 252 and braking system 209. Movement system 228 may further include a propulsion means.

Platform 227 may further be associated with channel 229, first opening 230, and second opening 231. Platform 227 may further operate in conjunction with source of grain 232. Platform 227 may operate such that grain 204 is received at first opening 230, grain passes through channel 229, and grain passes into bag 225 from platform 227 through second opening 231.

In an illustrative embodiment, first opening 230 may correspond to hopper 202, and channel 229 may correspond to stuffing auger 227. Second opening 231 may correspond to bag attachment means 205.

Source of grain 232 provides grain 204 to platform 227. In an illustrative embodiment, source of grain 232 may correspond to grain cart 210 and vehicle 208. Auger 223 may be included with grain cart 210.

Platform 227 may further operate in conjunction with controller 219. For example, controller 219 may manage and control movement system 228. Sensor system 233 may operate with controller 219. Sensor system 233 may include each of steering control system 215 and braking control system 216. Sensor system 233 may further detect position information with respect to each of platform 227 and source of grain 232.

As described herein, a first component may considered to be associated with a second component by being secured to the second component, bonded to the second component, fastened to the second component, and/or connected to the second component in some other suitable manner. The first component also may be connected to the second component using a third component. The first component may also be considered to be associated with the second component by being formed as part of, and/or an extension of, the second component.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

Referring now to a further aspect of FIG. 2, a bulk unloading grain cart is also depicted operating within grain loading environment 200 in accordance with an illustrative embodiment. A bulk unloading grain cart 271 may also operate in conjunction with the embodiments shown in FIG. 1. In addition to the features and descriptions heretofore explained with respect to grain cart 210, bulk unloading grain cart 271 may further include additional features allowing it to perform dump unloading. Bulk unloading grain cart 271 may include a bulk unloading system 272. Bulk unloading system 272 may include a rear dump 273, a side dump 274, or a bottom dump 275. A rear dump 273 encompasses a bulk unloading or gravity dump through a rear area of the bulk unloading grain cart 271. Side dump 274 encompasses bulk unloading or gravity dumping through a side area, and bottom dump 275 encompasses bulk unloading or gravity dumping of grain through a bottom area of the bulk unloading grain cart 271.

As used herein, the term bulk unloading refers to an unloading of a crop product such as grain done in bulk. Bulk unloading includes a gravity assisted unloading of bulk grain. Further, gravity unloading includes any kind of unloading done in bulk in which potential energy arising from an elevated position of the grain relative to a lower position assists in facilitating the unloading of the grain from an elevated position to a lower position. Bulk unloading may further be assisted by mechanical devices such as inclining beds, pushers, sweeps, plungers, and the like configured so as to move grain away from a storage point such that gravity will pull the grain to a lower position.

As used herein a grain bag refers to a flexible container configured to hold grain. A grain bag may be made of various materials. For example, the material may be, cloth, burlap, plastic. A grain bag may be affixed to a grain bagger, initially in a stored, compacted, or folded position. Upon receiving a loading or stuffing of grain, the grain bag can expand or stretch so as to receive the loaded grain.

Associated with bulk unloading system 272 are hydraulic piston and cylinder 276, including multiple sets thereof, and dump hydraulics 277. Sets of piston and cylinder 276 and dump hydraulics 277 are configured so as to assist or enable bulk unloading. For example, a moveable floor or portion of bulk unloading grain cart 271 may be elevated through hydraulic force so as to achieve bulk unloading. Other ancillary hydraulic equipment such as pumps, hoses, valves, and the like may also be present. Bulk unloading system 272 may include still other kinds of equipment. For example, the bulk unloading grain cart 271 may include quick release doors, windows, or gates that allow a quick gravity dumping of granular crop product. Moveable doors or gates such as hinged doors or sliding doors may further be employed. Thus, bulk unloading grain cart 271 may also include one or more of a gate 278, door 279, or window 280 for allowing bulk unloading therefrom.

Bulk unloading grain cart 271 may also include hinge 281, valves, latches and the like to enable mechanical movement of bulk unloading system 272.

Still referring to FIG. 2 an accumulation site is depicted with respect to grain loading environment 200 in accordance with an illustrative embodiment. Accumulation site 291 receives bulk unloading of grain. An accumulation site 291 may include a grain dump site, a storage bin, a grain hopper, a grain truck, or a grain rail car.

The location of accumulation site 291 may also vary. It may be located on the ground 296. A grain dump 292 for example may constitute a grain pile on the ground. The location may be above ground 297. For example, a grain rail car 295, storage bin 293, or grain truck 294 may rest on the ground such that its storage area is above ground. The bulk unloading grain cart 271 may drop its contents into such an above ground position. Movement of the bulk unloading grain cart 271 on ramps or an elevated structure so as to make a bulk unloading into a grain truck 294 or grain rail car 295 is within the scope of the embodiment. Additionally, the location of accumulation site 291 may be below ground 298. For example, a pit or trench may be dug and grain gravity dumped therein. A liner or separator may be included so as to isolate the grain or other crop product from contacting the ground in any of these configurations.

The illustration of grain loading environment 200 in FIG. 2 is not meant to imply physical or architectural limitations to the manner in which different advantageous embodiments may be implemented. Other components in addition to, and/ or in place of, the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, vehicle 208 and grain cart 210 may be a single platform. For example, grain bin 203 in grain cart 210 may incorporated into vehicle 208. For example, controller 221 and controller 219 may be combined controllers. For example, coordinated movement system 220 may be incorporated into a combined platform of vehicle 208 and grain cart 210. Additionally, coordinated movement system 220 may also encompass vehicle 208 in its coordination of movement.

Figure 3:
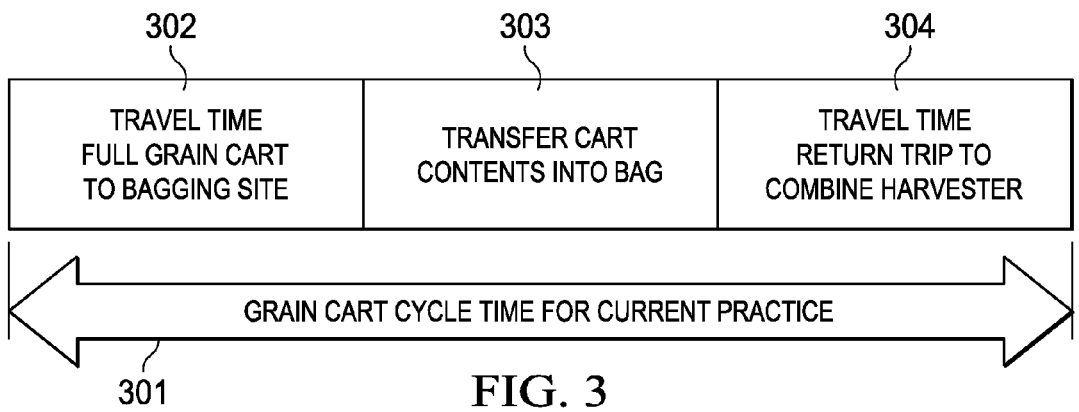
FIG. 3 is a bar chart showing grain cart cycle times in accordance with an illustrative embodiment.

Referring next to FIG. 3 a bar chart of a grain cart cycle time is depicted according to an illustrative embodiment. Element 301 reflects an overall grain cart cycle time, which may include a cycle time as grain cart 210 participates in a harvesting and bagging operation as further depicted in FIG. 1 or 2. Cycle time 301 itself breaks down into subcycles. Unit 302 reflects the travel time of grain cart 210 as it travels from harvester 224 to a bagging site. Unit 303 then reflects the time that grain cart 210 spends transferring its grain contents into a grain bag 225. The next unit of time 304, represents the travel time of grain cart 210 as it returns from the bagging site to the location of the combine harvester 224. Thus, cycle time 301 reflects the combined cycle time that grain cart 210 spends in travel away from harvester 224, unloading grain into grain bag 225, and returning to harvester 224.

The use of plastic silo bags 224 during a grain harvesting operation provides a framework in which to design a process improvement as relating to the grain cart cycle time. As shown in FIG. 3, a significant portion of cycle time 301 is spent in the unit of time 303 in transferring the contents of a full grain cart. Transfer time 303 represents a potential bottleneck. In one embodiment, cycle time 301 is improved by shortening the length of grain cart transferring time 303. In a further embodiment, cycle time 301 is further improved by decoupling the operations within grain cart transferring 303, into subprocesses of grain unloading and grain bagging. The subprocesses can then be scheduled so as to take place simultaneously, in parallel with other cycle time operations, thereby further improving grain cart cycle time 301.

Figure 4:
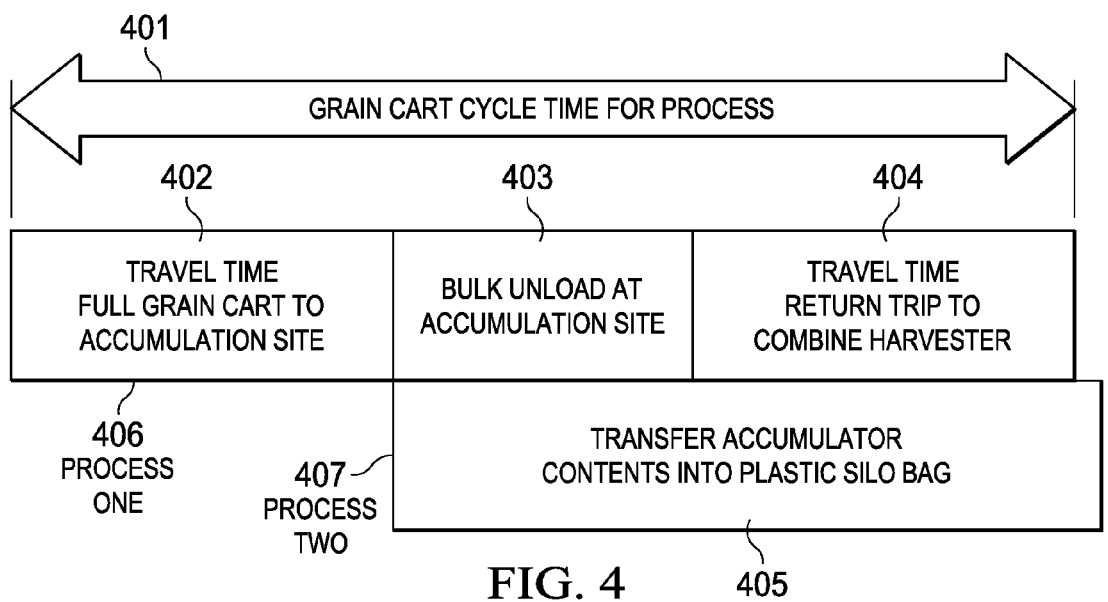
FIG. 4 is a bar chart also showing grain cart cycle times in accordance with an illustrative embodiment.

Referring next to FIG. 4 a bar chart depicting a modified grain cart cycle time 401 is illustrated according to an illustrative embodiment. Cycle time 401 is shorter than cycle time 301. Cycle time 401 includes subprocesses. A first time unit 402 comprises the travel time of a full grain cart 210 from harvester 224 to the grain bagging site. A unit of unloading time 403 comprises a time in which grain cart 210 makes a bulk unloading of grain 225 at an accumulation site 291. Time unit 404 corresponds to the travel time during which grain cart 210 returns from the accumulation site 291 to the harvester 224. The three subprocesses, travel time 402, bulk unloading 403, and return travel 404 comprise process one 406.

A further unit of time 405 comprises transferring grain from the accumulation site 291 into a grain bag 225. The process of transferring grain that corresponds to unit 405 need not involve the same grain cart 210 as used during subprocesses 402, 403, and 404, but different equipment may be used, as explained further herein. The unit of time 405 and its associated activity transferring grain from the accumulation site 291 to the gain bag 225 comprises process two 407.

In an illustrative embodiment, process one 406 and process two 407 of FIG. 4 take place simultaneously. Simultaneous processing of the two processes results in advantageous time savings for the overall harvesting and bagging operation.

Comparing FIG. 3 and FIG. 4, certain contrasts are noted. Bulk unloading step 403 is shorter than grain bagging step 302 in FIG. 3. However, in general, travel time 302 is roughly equivalent to travel time 402; each is the similar travel of time of a grain cart 210 traveling from a harvester 224 to an unloading location. In FIG. 3, the unloading location would be a location where grain bagging occurs 303, and in FIG. 4, the unloading location would be an accumulation site 291. Thus, travel time 402 may be somewhat different from travel time 402 in that the destination in 402 is an accumulation site 291 whereas the destination site in 402 is a grain bagging location.

Additionally, travel time 404 is roughly equivalent to travel time 404 in that each represents a return travel time of a grain cart 210 to a harvester 224. However, again, the two return times 304 and 404 may be somewhat different in that the start points differ. In 404, the start point is a grain bagging location, and for 304 the start point is the accumulation site 291.

Interval 403 corresponds to a bulk unloading of grain 204 from grain cart 210. For this reason, interval 403 is shorter than interval 303. In bulk unloading, the mass of grain 204 held within grain bin 203 of grain cart 210 s unloaded in a quickened period of time. An illustrative example of bulk unloading is a gravity dump. A further illustrative example of bulk unloading includes dumping a load of grain from a grain cart configured with a dump truck configuration. A still further illustrative example of bulk unloading includes dumping a load of grain from an opening such as a door or gate configured in the grain cart.

Various illustrative embodiments of the grain cart which incorporate bulk unloading features are described further herein.

Still referring to FIG. 4, interval 403 also includes the bulk unloading of grain at an accumulation site 291. An accumulation site 291 comprises a location in which a crop material such as grain carried in a bulk unloading grain cart 271, may undergo bulk unloading. Accumulation site 291 may further correspond to a location at which multiple loads of grain are bulk unloaded, either by the same, or a plurality of different, bulk unloading grain carts 271. In an illustrative embodiment, accumulation site 291 comprises a grain dump site located on the ground. In a further illustrative embodiment, accumulation site 291 is a bulk grain storage bin such as a bulk grain truck or rail car.

Concluding with the description of FIG. 4, unit 404 represents the travel time during which bulk unloading grain cart 271 returns to harvester 224 from accumulation site 291. Unit 405 represents a unit of time to transfer grain at the accumulation site 291 into a grain bag 225. However, as depicted in FIG. 4, the transferring of grain into bag 225 may occur simultaneously with respect to the other time units.

Figure 5:
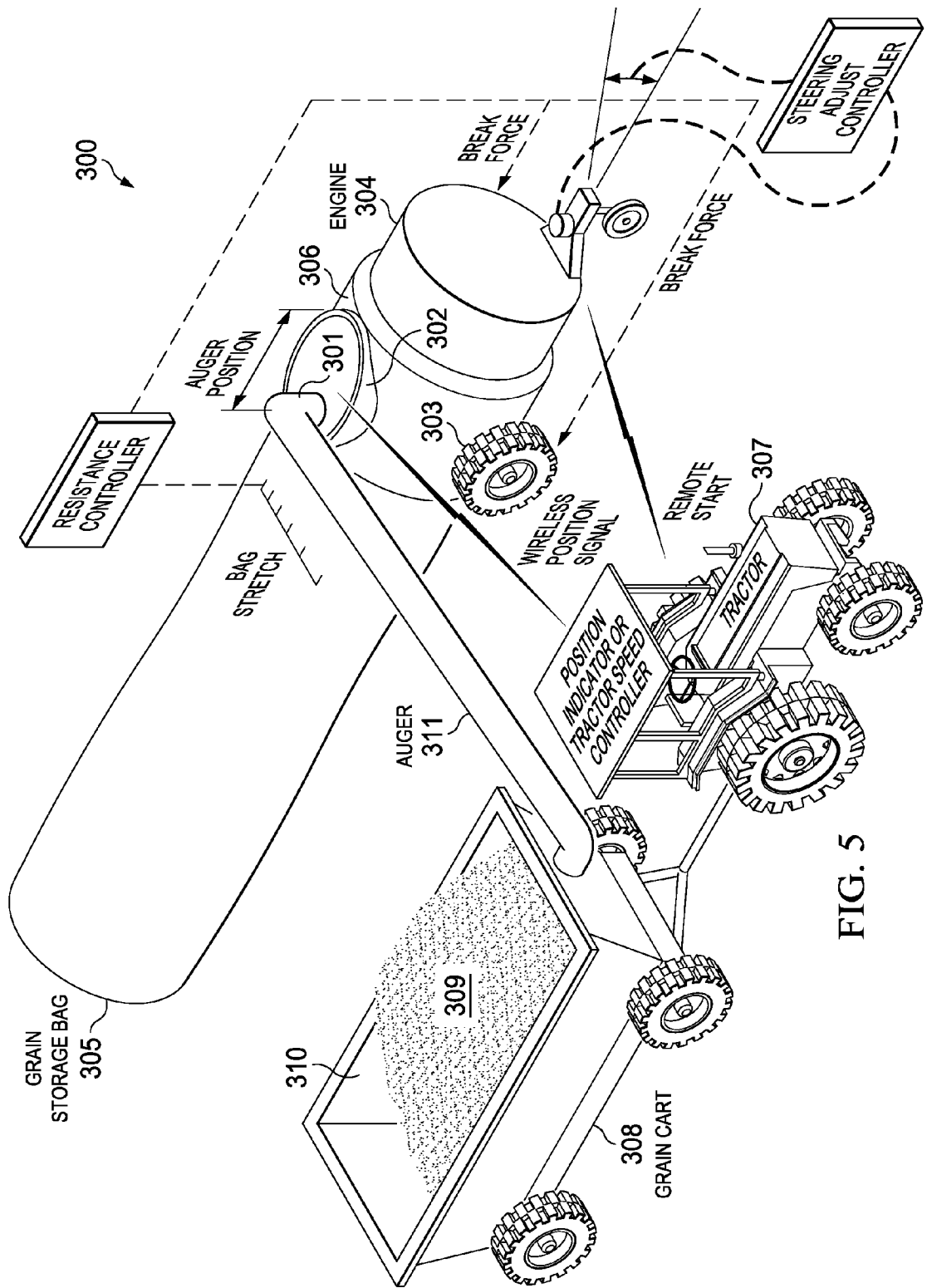
FIG. 5 is a perspective view of a tractor and grain cart assembly disposed in a loading position with respect to a grain cart in accordance with an illustrative embodiment.

Referring now to FIG. 5, an illustration of a grain loading system is depicted in accordance with an illustrative embodiment. In this depicted example, grain loading system 500 is an example of one implementation for grain loading system 240 in FIG. 2. The grain bagging operation generally proceeds as follows in accordance with an illustrative embodiment. The operation of FIG. 5 may also proceed in accordance with the illustrative embodiments as shown in FIGS. 1 and 2. An auger 511 disposed on grain cart 508 is moved such that a distal end 501 or filling end of auger 511 is positioned over a hopper 502 on grain bagger 506.

Operation of auger 511 transports grain 509 from the storage bin 510 in grain cart 508 through auger 511 so as to fall from distal end 501 of auger 511 into hopper 502 on grain bagger 506. Once the grain 509 has fallen within hopper 502, the grain 509 is transferred into grain bag 505. The transfer into the bag can take place through several known processes. These processes include, for example, the use of a second auger (not shown) and a bagging auger, which pushes the grain 509 into grain bag 505 so as to cause grain bag 505 to stretch.

In these illustrative examples, an empty grain bag 505 is loaded onto grain bagger 506 in a compacted or folded arrangement. The filling and stretching of grain bag 505 with grain causes the expanding bag 505 to unwind from its loaded and compacted position on grain bagger 506. The filled portion of grain bag 505 then moves off of grain bagger 506 and rests on the ground. Additionally, the stretching and expansion of grain bag 505 exerts a propelling force on grain bagger 506 itself so as to urge grain bagger 506 in a forward movement, a movement away from the unfolding grain bag 505.

In order to obtain a desired level of stretch and filling of grain bag 505, the forward movement of grain bagger 506 is retarded through application of braking force on the wheels 503 of grain bagger 506. However, care must be taken not to overbrake grain bagger 506 lest this cause grain bag 505 to stretch unduly. Consequently, it has been a manual operation performed by equipment attendants to closely observe the stretching of grain bag 505 and adjust braking of wheels 503 accordingly. If the bag 505 is understretched, the braking force is increased; and if the bag 505 is overstretched, the braking force is lessened. Heretofore, the measurement of grain bag stretch has been a simple direct measurement of the distance between stretch marks printed on, or otherwise applied to, the surface of grain bag 505. Once filled, grain bag 505 is closed, detached from grain bagger 506, and grain bag 505 remains resting on the ground until access the stored grain therein is desired.

Continuing with the description of the filling of grain bag 505, it is noted that grain bagger 506 slowly creeps forward as the attached grain bag 505 fills with grain 509. This movement of grain bagger 506 also means that attached hopper 502 also moves forward. However, as currently practiced, with manual observations of bag stretching and manual application of braking force, the forward movement of grain bagger is rarely even or smooth and is often plagued by uneven velocity changes. This situation is problematical because distal end 501 of auger 511 should be maintained in a position over hopper 502, a loading position, so that grain 509 may fall by gravity from auger 511 into hopper 502. Current loading operations suffer from loss of grain when distal end 501 of auger 511 falls out of the loading position with respect to hopper 502 such that grain 509 does not fall into hopper 502 but misses hopper 502 altogether and falls on the ground. In current practice, a driver of tractor 507 will attempt to observe the positioning of distal end 501 of auger 511 with respect to hopper 502 and will attempt to adjust the velocity of tractor 507 accordingly. It is attempted to maintain the velocity of tractor 507, which pulls grain cart 508, so as to match that of grain bagger 506, and in this way to also maintain the desired positioning of auger 511 and hopper 502. This operation requires the driver to maintain constant vigilance of the auger 511 and hopper 502. Additionally, because the movement of grain bagger 506 tends to be uneven, the attention by the tractor driver on the controls of the tractor's brake and accelerator may be more than desired.

With respect to manpower needs, in current practice the grain bagging operation requires multiple attendants. Typically, one attendant is used exclusively to monitor the stretching of the grain bag 505 and to apply braking force to the grain bagger 506. The attendant, in addition to monitoring the bag stretch and applying braking, may also be employed in steering a second tractor (not shown) that is attached to the grain bagger. In these examples, each of the two wheels 503 is independently braked. This arrangement means that the attendant runs from side to side of grain bagger 506 to apply braking force independently to each of the two wheels 503. Additionally, the attendant may be climbing into and out of the cab of the second tractor in order to switch between steering of the tractor and managing the grain bagger. This activity is potentially unsafe and can become an unmanageable level of work for the attendant.

In current system configurations, braking is applied manually as by torquing an external brake pad onto an upper surface of a rubber tire 503. This also has the shortcoming of the attendant only being able to approximate an equal braking strength onto each of the tires. If there is no third worker present to steer the second tractor, the second attendant is also typically employed to steer the second tractor (not shown) that is attached to the grain bagger. It is noted that in current practice the second tractor is required to provide mechanical (PTO) power so as to operate the stuffing auger of grain bagger 506. Additionally, a further attendant operates the tractor 507 that is attached to grain cart 508. In the automated embodiments described herein, the grain bagging operation dispenses with the second tractor altogether and reduces manpower needs to a single driver of the grain cart's tractor 507.

The different illustrative embodiments overcome these shortcomings by providing automated bag stretch detection coupled with automated braking and automated steering control of grain bagger 506. Further, different illustrative embodiments provide automated detection of auger 511 and hopper 502 positioning such that coordinated movement of grain bagger 506 and tractor 507 and grain cart 508 maintain the distal end 501 of auger 511 in the loading position relative to hopper 502. An engine 504, or prime mover positioned on grain bagger 506, provides power to grain bagger 506 which had previously been supplied by the second tractor PTO. Thus, in the illustrative embodiment, the grain bagger is self-powered. This allows an operator to completely eliminate the second tractor from the grain bagging operation. Additionally, due to the automated system now provided, the grain bagging operation can proceed with minimal human supervision. Personnel needs can be reduced to a single attendant.

Robotic or autonomous vehicles, sometimes referred to as mobile robotic platforms, generally have a centralized robotic control system that controls the operational systems of the vehicle. In different embodiments of the automated grain bagger 506, the operational systems may include steering and braking systems. Some military vehicles have been adapted for autonomous operation. In the United States, some tanks, personnel carriers, Stryker vehicles, and other vehicles have been adapted for autonomous capability. Generally, these are to be used in a teleoperated or manned mode as well.

Robotic control system sensor inputs to grain bagger 107, as shown in FIG. 1, may include data associated with the vehicle's destination, preprogrammed path information, and detected obstacle information. Based on such data associated with the information above, the vehicle's movements are controlled. Obstacle detection systems within a vehicle may use scanning lasers to scan a beam over a field of view, or cameras to capture images over a field of view. The scanning laser may cycle through an entire range of beam orientations, or provide random access to any particular orientation of the scanning beam. The camera or cameras may capture images over the broad field of view, or of a particular spectrum within the field of view. For obstacle detection applications of a vehicle, the response time for collecting image data should be rapid over a wide field of view to facilitate early recognition and avoidance of obstacles.

Optionally, simplified sensor inputs for the automated grain bagger 107 as in FIG. 1 may rely on GPS information or radio signals. The grain bagger 107 in FIG. 1 may include a GPS receiver so as to receive GPS information or radio signal regarding the grain cart's location. Additionally, a desired course or way point can be selected and programmed into a GPS or course controller. In this manner, comparison of the sensed location with the desired location allows the controller to produce a course correction information and signal which is sent to vehicle actuators.

Location sensing devices include odometers, global positioning systems, and vision-based triangulation systems. Many location sensing devices are subject to errors in providing an accurate location estimate over time and in different geographic positions. Odometers are subject to material errors due to surface terrain. Satellite-based guidance systems, such as global positioning system-based guidance systems, which are commonly used today as a navigation aid in cars, airplanes, ships, computer-controlled harvesters, mine trucks, and other vehicles, may experience difficulty guiding when heavy foliage or other permanent obstructions, such as mountains, buildings, trees, and terrain, prevent or inhibit global positioning system signals from being accurately received by the system. Vision-based triangulation systems may experience error over certain angular ranges and distance ranges because of the relative position of cameras and landmarks.

In order to provide a system and method where multiple vehicles accurately navigate and manage a work-site, specific mechanical accommodations for processing means and location sensing devices are required. Therefore, it would be advantageous to have a method and apparatus to provide additional features for navigation and coordination of multiple vehicles.

The illustrative embodiments recognize a need for a system and method where grain bagging vehicles can accurately navigate and manage a grain bagging operation at a work-site. Therefore, the illustrative embodiments provide a computer implemented method, apparatus, and computer program product for coordinating multiple vehicles in automated grain bagging operation. A grain bagger is provided with sensors connected to controllers so as to provide automated braking and steering commands for the grain bagger. Further machine behaviors are assigned to multiple vehicles such as tractors and the grain bagger for performing automated grain bagging. The vehicles are coordinated to perform the task using the assigned behaviors and a number of signals received from other vehicles and the environment during performance of the task.

In addition, the different illustrative embodiments may be implemented in any number of vehicles. For example, the different illustrative embodiments may be implemented in as few as two vehicles, or in four or five vehicles, or any number of multiple vehicles. Further, the different illustrative embodiments may be implemented in a heterogeneous group of vehicles or in a homogeneous group of vehicles.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

Figure 6:
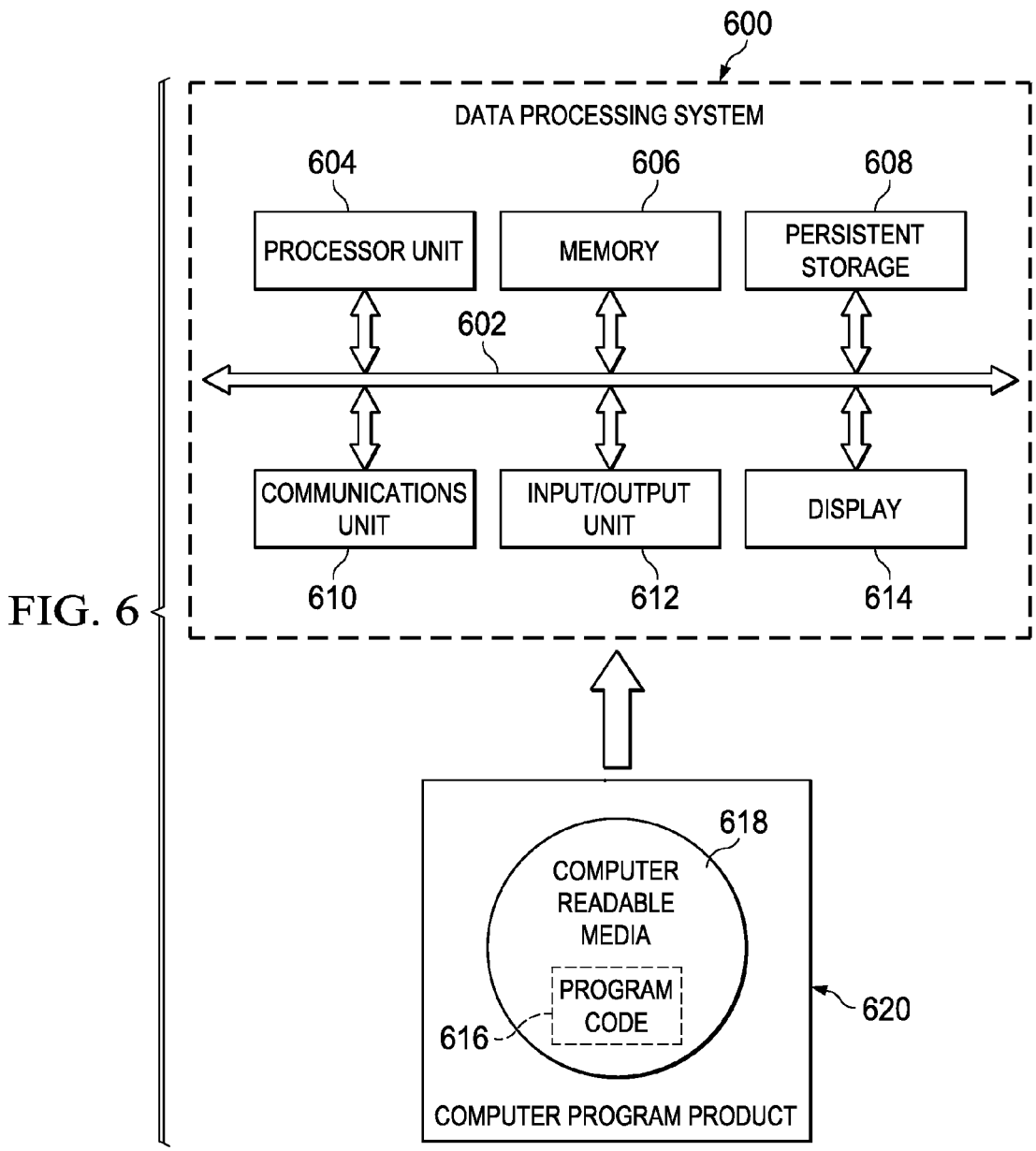
FIG. 6 is a block diagram of a data processing system in accordance with an illustrative embodiment.

With reference now to FIG. 6, a block diagram of a data processing system which may be used in conjunction with the previously described systems and equipment in FIGS. 1, 2, and 5 is depicted in accordance with an illustrative embodiment. Data processing system 600 is an example of one manner in which the network environment across and agricultural vehicles 101, 102, 106 and 107 in FIG. 1 may be implemented. In this illustrative example, data processing system 600 includes communications fabric 602, which provides communications between processor unit 604, memory 606, persistent storage 608, communications unit 610, input/output (I/O) unit 612, and display 614.

Processor unit 604 serves to execute instructions for software that may be loaded into memory 606. Processor unit 604 may be a set of one or more processors or may be a multi-processor core, depending on the particular implementation. Further, processor unit 604 may be implemented using one or more heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices. A storage device is any piece of hardware that is capable of storing information either on a temporary basis and/or a permanent basis. Memory 606, in these examples, may be, for example, a random access memory or any other suitable volatile or non-volatile storage device. Persistent storage 608 may take various forms depending on the particular implementation. For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communication links.

Input/output unit 612 allows for input and output of data with other devices that may be connected to data processing system 600. For example, input/output unit 612 may provide a connection for user input through a keyboard and mouse. Further, input/output unit 612 may send output to a printer. Display 614 provides a mechanism to display information to a user.

Instructions for the operating system and applications or programs are located on persistent storage 608. These instructions may be loaded into memory 606 for execution by processor unit 604. The processes of the different embodiments may be performed by processor unit 604 using computer implemented instructions, which may be located in a memory, such as memory 606. These instructions are referred to as program code, computer usable program code, or computer readable program code that may be read and executed by a processor in processor unit 604. The program code in the different embodiments may be embodied on different physical or tangible computer readable media, such as memory 606 or persistent storage 608.

Program code 616 is located in a functional form on computer readable media 618 that is selectively removable and may be loaded onto or transferred to data processing system 600 for execution by processor unit 604. Program code 616 and computer readable media 618 form computer program product 620 in these examples. In one example, computer readable media 618 may be in a tangible form, such as, for example, an optical or magnetic disc that is inserted or placed into a drive or other device that is part of persistent storage 608 for transfer onto a storage device, such as a hard drive that is part of persistent storage 608. In a tangible form, computer readable media 618 also may take the form of a persistent storage, such as a hard drive, a thumb drive, or a flash memory that is connected to data processing system 600. The tangible form of computer readable media 618 is also referred to as computer recordable storage media. In some instances, computer readable media 618 may not be removable.

Alternatively, program code 616 may be transferred to data processing system 600 from computer readable media 618 through a communications link to communications unit 610 and/or through a connection to input/output unit 612. The communications link and/or the connection may be physical or wireless in the illustrative examples. The computer readable media also may take the form of non-tangible media, such as communication links or wireless transmissions containing the program code.

The different components illustrated for data processing system 600 are not meant to provide architectural limitations to the manner in which different embodiments may be implemented. The different illustrative embodiments may be implemented in a data processing system including components in addition to, or in place of, those illustrated for data processing system 600. Other components shown in FIG. 6 can be varied from the illustrative examples shown.

As one example, a storage device in data processing system 600 is any hardware apparatus that may store data. Memory 606, persistent storage 608, and computer readable media 618 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606 or a cache, such as found in an interface and memory controller hub that may be present in communications fabric 602.

Figure 7:
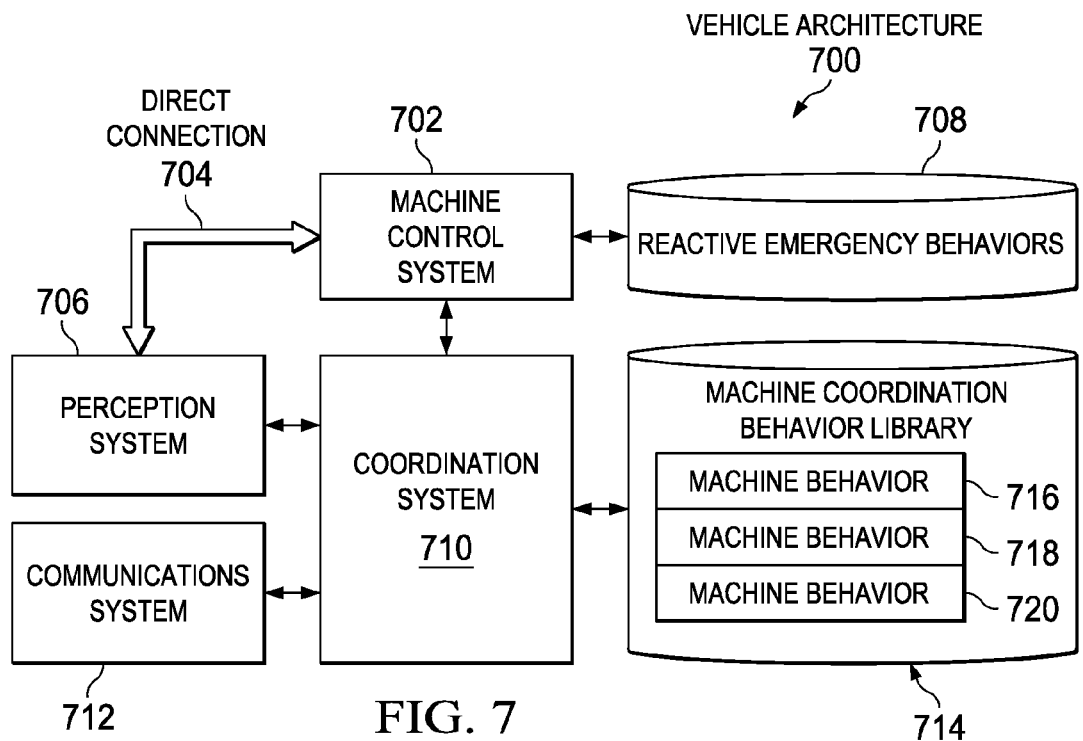
FIG. 7 is a block diagram of a vehicle coordination system in accordance with an illustrative embodiment.

With reference now to FIG. 7, a block diagram of a vehicle coordination system is depicted in accordance with an illustrative embodiment. In this example, vehicle architecture 700 is an example of a vehicle, such as agricultural vehicle 106 or 107, in FIG. 1 or vehicle 208, grain bagger 212, or tractor 208 as shown in FIG. 2. In this example, vehicle architecture 700 has components that control systems of the vehicle. In this example, vehicle architecture 700 includes machine control system 702, perception system 706, reactive emergency behaviors 708, coordination system 710, communications system 712, and machine coordination behavior library 714.

Machine control system 702 provides basic mobility functions, such as, for example, without limitation, steering, gear shifting, throttling, and braking, as well as a task, such as payload functions, which may include grain harvesting. Machine control system 702 may include a number of redundant vehicle control components located on each vehicle in a worksite to provide machine control with fault tolerance. For example, redundant actuators controlling a braking system may provide for fault tolerance if one actuator malfunctions, enabling another actuator to maintain control of the braking system for the vehicle and providing high integrity to the vehicle control system. Different types of control components also may be present for controlling the same function on a vehicle. In one illustrative embodiment, at low speeds, steering can be accomplished by selectively locking wheels to implement skid steering. In another illustrative embodiment, vehicle speed can be reduced by shifting to a lower gear and letting the engine provide braking action.

Machine control system 702 may have a direct connection 704 to perception system 706. Direct connection 704 allows machine control system 702 to implement select reactive emergency behaviors 708 in response to information received from perception system 706.

Perception system 706 collects information about the environment around a vehicle using multiple redundant heterogeneous sensors. Perception system 706 may have a direct connection 704 to machine control system 702. In this example, information collected by perception system 706 is sent to machine control system 702 to provide data in identifying how the vehicle should move in response to different environmental factors.

Reactive emergency behaviors 708 may include, for example, collision avoidance behaviors. Examples of collision avoidance behaviors may be behaviors, such as steering around an object or braking to avoid collision with an object.

Coordination system 710 performs processing for machine coordination. The processing means may be physically co-existing with machine control system 702, or have separate processing resources. Coordination system 710 may have multiple processors in case one processor fails. The redundancy may include having different types of components for the same functions. For example, two different types of operating systems may be used to execute behaviors used to coordinate movement of the vehicle in case an error occurs in one of the operating systems.

Coordination system 710 may share processing means with machine control system 702 or may have separate processing resources. The processing resources may be located locally in vehicle architecture 700 or a combination in which some processing components are located in vehicle architecture 700 and some processing components are located remotely from vehicle architecture 700. Coordination system 710 can receive information from each of machine control system 702, perception system 706, reactive emergency behaviors 708, communications system 712, and machine coordination behavior library 714. Coordination system 710 evaluates the information received by each of these systems in order to either initiate a new behavior or continue with the current behavior. Proposed new behaviors are compared across the redundant processing means and resources to determine the actual action to signal to high integrity vehicle architecture 700. A coordinated behavior is a machine behavior that involves at least one additional machine, results in a change of state for at least one of the machines, and cannot be accomplished by the machines acting independently of one another. There is at least one of a shared goal, shared future state, shared intention, shared plan, or a shared mission which may be shared a priori, be generated in situ, or be a combination of the two, such as an a prior plan which is updated based on in-situ conditions. A coordinated behavior for multiple vehicles may result in sequences or steps of more primitive behaviors being passed to high integrity machine control system 702 for execution and status reporting. For example, in an illustrative embodiment, a coordinated behavior of "maintain loading position of auger and hopper" may result in sequences of primitive behaviors such as tractor and grain cart control. These sequences or steps may be executed by high integrity machine control system 702.

Communications system 712 contains multiple communication links and channels which may also provide redundancy for fail-safe communications. For example, communications system 712 may include AM radio frequency channels, FM radio frequency channels, cellular frequencies, global positioning system receivers, Bluetooth receivers, Wi-Fi channels, and Wi-Max channels.

Machine coordination behavior library 714 is accessed by processing means of coordination system 710. Machine coordination behavior library 714 contains machine behaviors 716, 718, and 720, which are specific to machine coordination. Other non-coordinating behaviors, such as path trajectory following and automatic cruise control, may be located elsewhere, such as in machine control system 702. There may be multiple copies of machine coordination behavior library 714 on each vehicle system, such as vehicle architecture 700.

Machine coordination behavior library 714 supports a wide range of types of coordination behaviors. For example, in an illustrative embodiment, machine behaviors 716, 718, and 720 may be coordination behaviors for tasks and subtasks or aspects of a task. Examples of tasks may include, without limitation, grain bagging, coordinated movement, tool (auger) unfolding, tool storage, traveling over terrain, and the like.

Figure 8:
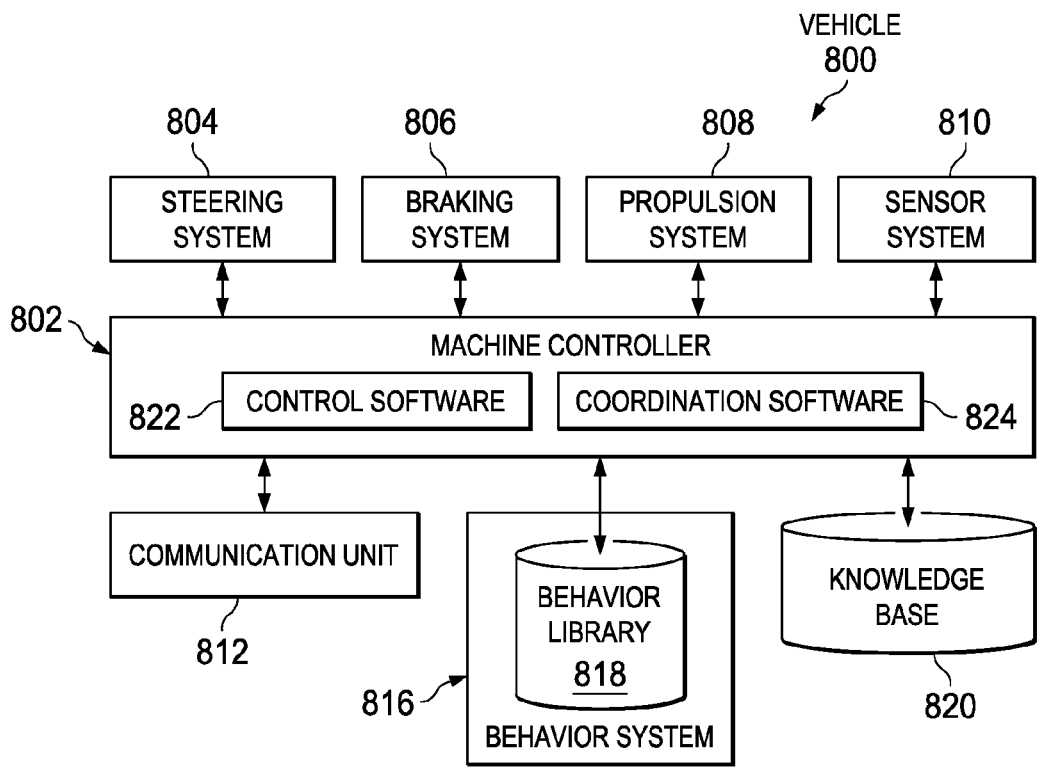
FIG. 8 is a block diagram of components used to control a vehicle in accordance with an illustrative embodiment.

With reference now to FIG. 8, a block diagram of components used to control a vehicle is depicted in accordance with an illustrative embodiment. In this example, vehicle 800 is an example of a vehicle, such as agricultural vehicle 106 or 107 in FIG. 1 or vehicle 208, grain bagger 212, or tractor 208 as shown in FIG. 2. Vehicle 800 is an example of one implementation of vehicle architecture 700 in FIG. 7. In this example, vehicle 800 includes machine controller 802, steering system 804, braking system 806, propulsion system 808, sensor system 810, communication unit 812, behavior system 816, behavior library 818, and knowledge base 820.

Machine controller 802 may be, for example, a data processing system, such as data processing system 600 in FIG. 6, or some other device that may execute processes to control movement of a vehicle. Machine controller 802 may be, for example, a computer, an application integrated specific circuit, and/or some other suitable device. Different types of devices and systems may be used to provide redundancy and fault tolerance. Machine controller 802 includes control software 822 and coordination software 824. Machine controller 802 may execute processes using control software 822 to control steering system 804, braking system 806, and propulsion system 808 to control movement of the vehicle. Machine controller 802 may also use coordination software 824 to coordinate the movements of each vehicle receiving commands from machine controller 802. Machine controller 802 may send various commands to these components to operate the vehicle in different modes of operation. These commands may take various forms depending on the implementation. For example, the commands may be analog electrical signals in which a voltage and/or current change is used to control these systems. In other implementations, the commands may take the form of data sent to the systems to initiate the desired actions.

Steering system 804 may control the direction or steering of the vehicle in response to commands received from machine controller 802. Steering system 804 may be, for example, an electrically controlled hydraulic steering system, an electrically driven rack and pinion steering system, an Ackerman steering system, a skid-steer steering system, a differential steering system, or some other suitable steering system.

Braking system 806 may slow down and/or stop the vehicle in response to commands from machine controller 802. Braking system 806 may be an electrically controlled steering system. This steering system may be, for example, a hydraulic braking system, a friction braking system, or some other suitable braking system that may be electrically controlled.

In these examples, propulsion system 808 may move the vehicle in response to commands from machine controller 802. Propulsion system 808 may maintain or increase the speed at which a vehicle moves in response to instructions received from machine controller 802. Propulsion system 808 may be an electrically controlled propulsion system. Propulsion system 808 may be, for example, an internal combustion engine, an internal combustion engine/electric hybrid system, an electric engine, or some other suitable propulsion system.

Sensor system 810 includes a perception system and may be a set of sensors used to collect information about systems and the environment around a vehicle. In these examples, the information is sent to machine controller 802 to provide data in identifying how the vehicle should move in different modes of operation. In these examples, a set refers to one or more items. A set of sensors is one or more sensors in these examples.

Communication unit 812 includes a communications system and may provide multiple redundant communication links and channels to machine controller 802 to receive information. The communication links and channels may be heterogeneous and/or homogeneous redundant components that provide fail-safe communication. This information includes, for example, data, commands, and/or instructions. Communication unit 812 may take various forms. For example, communication unit 812 may include a wireless communications system, such as a cellular phone system, a Wi-Fi wireless system, a Bluetooth wireless system, and/or some other suitable wireless communications system. Further, communication unit 812 also may include a communications port, such as, for example, a universal serial bus port, a serial interface, a parallel port interface, a network interface, and/or some other suitable port to provide a physical communications link. Communication unit 812 may be used to communicate with a remote location or an operator.

Behavior system 816 contains behavior library 818, which in turn contains various behavioral processes specific to machine coordination that can be called and executed by machine controller 802. Behavior system 816 may be implemented in a remote location or in one or more vehicles. Behavior system 816 may be distributed throughout multiple vehicles, or reside locally on one control vehicle, such as vehicle architecture 700 in FIG. 7. In an illustrative embodiment, where behavior system 816 resides on one control vehicle, the control vehicle may distribute behavior libraries as needed to one or more other vehicles. In another illustrative embodiment, some components of behavior system 816 may be located in a control vehicle or in one or more vehicles, while other components of behavior system 816 may be located in a back office or remote location (not shown). For example, behavior library 818 may be located on a vehicle while other aspects of behavior system 816 are located in a back office or remote location (not shown). In one illustrative embodiment, there may be multiple copies of behavior library 818 within behavior system 816 on vehicle 800 in order to provide redundancy.

Knowledge base 820 contains information about the operating environment, such as, for example, a fixed map showing streets, structures, tree locations, and other static object locations. Knowledge base 820 may also contain information, such as, without limitation, local flora and fauna of the operating environment, current weather for the operating environment, weather history for the operating environment, specific environmental features of the work area that affect the vehicle, and the like. The information in knowledge base 820 may be used to perform classification and plan actions. Knowledge base 820 may be located entirely in vehicle 800 or parts or all of knowledge base 820 may be located in a remote location that is accessed by machine controller 802.

Figure 9:
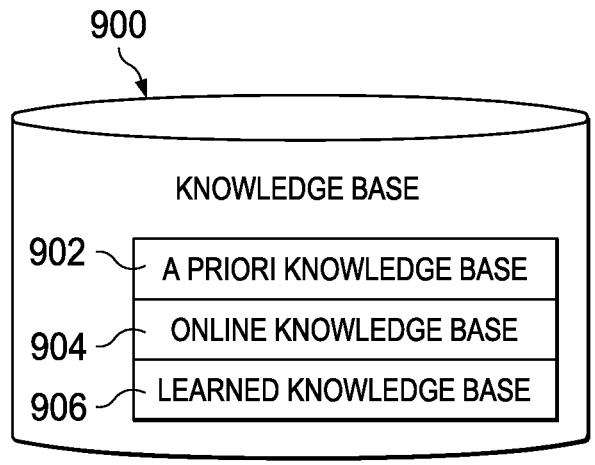
FIG. 9 is a block diagram of a knowledge base in accordance with an illustrative embodiment.

With reference now to FIG. 9, a block diagram of a knowledge base is depicted in accordance with an illustrative embodiment. Knowledge base 900 is an example of a knowledge base component of a machine controller, such as knowledge base 820 of vehicle 800 in FIG. 8. For example, knowledge base 900 may be, without limitation, a component of a navigation system, an autonomous machine controller, a semi-autonomous machine controller, or may be used to make management decisions regarding work-site activities and coordination activities. Knowledge base 900 includes a priori knowledge base 902, online knowledge base 904, and learned knowledge base 906.

A priori knowledge base 902 contains static information about the operating environment of a vehicle. Types of information about the operating environment of a vehicle may include, without limitation, a fixed map showing streets, structures, trees, and other static objects in the environment; stored geographic information about the operating environment; and weather patterns for specific times of the year associated with the operating environment.

A priori knowledge base 902 may also contain fixed information about objects that may be identified in an operating environment, which may be used to classify identified objects in the environment. This fixed information may include attributes of classified objects, for example, an identified object with attributes of tall, narrow, vertical, and cylindrical, may be associated with the classification of "telephone pole." A priori knowledge base 902 may further contain fixed work-site information. A priori knowledge base 902 may be updated based on information from online knowledge base 904, and learned knowledge base 906.

Online knowledge base 904 may be accessed with a communications unit, such as communications unit 812 in FIG. 8, to wirelessly access the Internet. Online knowledge base 904 dynamically provides information to a machine control process which enables adjustment to sensor data processing, site-specific sensor accuracy calculations, and/or exclusion of sensor information. For example, online knowledge base 904 may include current weather conditions of the operating environment from an online source. In some examples, online knowledge base 904 may be a remotely accessed knowledge base.

This weather information may be used by machine controller 802 in FIG. 8 to determine which sensors to activate in order to acquire accurate environmental data for the operating environment. Weather, such as rain, snow, fog, and frost may limit the range of certain sensors, and require an adjustment in attributes of other sensors in order to acquire accurate environmental data from the operating environment. Other types of information that may be obtained include, without limitation, vegetation information, such as foliage deployment, leaf drop status, and lawn moisture stress, and construction activity, which may result in landmarks in certain regions being ignored.

Learned knowledge base 906 may be a separate component of knowledge base 900, or alternatively may be integrated with a priori knowledge base 902 in an illustrative embodiment. Learned knowledge base 906 contains knowledge learned as the vehicle spends more time in a specific work area, and may change temporarily or long-term depending upon interactions with online knowledge base 904 and user input. For example, learned knowledge base 906 may detect the absence of a tree that was present the last time it received environmental data from the work area. Learned knowledge base 906 may temporarily change the environmental data associated with the work area to reflect the new absence of a tree, which may later be permanently changed upon user input confirming the tree was in fact cut down. Learned knowledge base 906 may learn through supervised or unsupervised learning.

Figure 10:
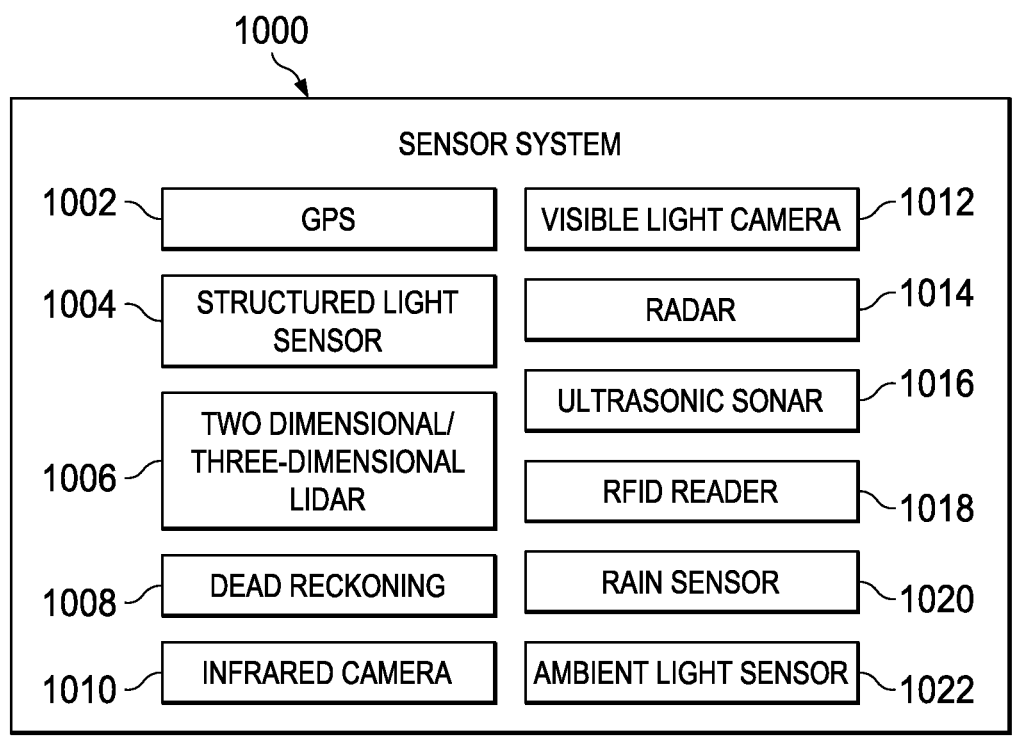
FIG. 10 is a block diagram of a sensor system in accordance with an illustrative embodiment.

With reference now to FIG. 10, a block diagram of a sensor system is depicted in accordance with an illustrative embodiment. Sensor system 1000 is an example of one implementation of sensor system 810 in FIG. 8. Sensor system 1000 is also an example of one implementation of perception system 706 in FIG. 7. Sensor system 1000 may provide information for safeguarding, relative positioning, and/or global positioning. For example, in an illustrative embodiment, if a worker is operating in a worksite alongside vehicles, such as agricultural vehicles 101, 102, 106, 107 and 108 or vehicle 208, grain bagger 212, or tractor 208 as shown in FIG. 2, sensor system 1000 may provide information about the position of each of the agricultural vehicles in relation to each other, as well as the location of the worker in relation to each of the agricultural vehicles 104, 106, and 108. This information allows for safeguarding of the worker as well as each of agricultural vehicles as they operate together in a worksite. This information also provides relative positioning of each vehicle operating in a worksite for use in vehicle coordination.

As illustrated, sensor system 1000 may include, for example, global positioning system 1002, structured light sensor 1004, two dimensional/three dimensional lidar 1006, dead reckoning 1008, infrared camera 1010, visible light camera 1012, radar 1014, ultrasonic sonar 1016, radio frequency identification reader 1018, rain sensor 1020, and ambient light sensor 1022. These different sensors may be used to identify the environment around a vehicle. The sensors in sensor system 1000 may be selected such that one of the sensors is always capable of sensing information needed to operate the vehicle in different operating environments. Global positioning system 1002 may identify the location of the vehicle with respect to other objects in the environment. Global positioning system 1002 may be any type of radio frequency location scheme based on signal strength and/or time of flight. Examples include, without limitation, the Global Positioning System, Glonass, Galileo, and cell phone tower relative signal strength. Position is typically reported as latitude and longitude with an error that depends on factors, such as ionospheric conditions, satellite constellation, and signal attenuation from vegetation.

Structured light sensor 1004 emits light in a pattern, such as one or more lines, reads back the reflections of light through a camera, and interprets the reflections to detect and measure objects in the environment. Two dimensional/three dimensional lidar 1006 is an optical remote sensing technology that measures properties of scattered light to find range and/or other information of a distant target. Two dimensional/three dimensional lidar 1006 emits laser pulses as a beam, then scans the beam to generate two dimensional or three dimensional range matrices. The range matrices are used to determine distance to an object or surface by measuring the time delay between transmission of a pulse and detection of the reflected signal.

Dead reckoning 1008 begins with a known position, which is then advanced, mathematically or directly, based upon known speed, elapsed time, and course. The advancement based upon speed may use the vehicle odometer, or ground speed radar, to determine distance traveled from the known position. Infrared camera 1010 detects heat indicative of a living thing versus an inanimate object. An infrared camera may also form an image using infrared radiation. Visible light camera 1012 may be a standard still-image camera, which may be used alone for color information or with a second camera to generate stereoscopic, or three-dimensional, images. When visible light camera 1012 is used along with a second camera to generate stereoscopic images, the two or more cameras may be set with different exposure settings to provide improved performance over a range of lighting conditions. Visible light camera 1012 may also be a video camera that captures and records moving images.

Radar 1014 uses electromagnetic waves to identify the range, altitude, direction, or speed of both moving and fixed objects. Radar 1014 is well known in the art, and may be used in a time of flight mode to calculate distance to an object, as well as Doppler mode to calculate the speed of an object. Ultrasonic sonar 1016 uses sound propagation on an ultrasonic frequency to measure the distance to an object by measuring the time from transmission of a pulse to reception and converting the measurement into a range using the known speed of sound. Ultrasonic sonar 1016 is well known in the art and can also be used in a time of flight mode or Doppler mode, similar to radar 1014. Radio frequency identification reader 1018 relies on stored data and remotely retrieves the data using devices called radio frequency identification (RFID) tags or transponders.

Rain sensor 1020 detects precipitation on an exterior surface of the vehicle. In one embodiment, rain sensor 1020 includes an infrared beam and an infrared sensor. In this illustrative example, rain sensor 1020 operates by beaming an infrared light at a 45-degree angle into the windshield of the vehicle from the inside of the vehicle. If the windshield is wet, less light makes it back to the sensor, indicating the presence of moisture on the windshield and the likelihood of rain. The illustrative embodiment is not meant to limit the architecture of rain sensor 1020. Other rain detection technologies may be used without departing from the spirit and scope of the invention. Ambient light sensor 1022 measures the amount of ambient light in the operating environment.

Sensor system 1000 may retrieve environmental data from one or more of the sensors to obtain different perspectives of the environment. For example, sensor system 1000 may obtain visual data from visible light camera 1012, data about the distance of the vehicle in relation to objects in the environment from two dimensional/three dimensional lidar 1006, and location data of the vehicle in relation to a map from global positioning system 1002.

Sensor system 1000 is capable of detecting objects even in different operating environments. For example, global positioning system 1002 may be used to identify a position of the vehicle. If the street has trees with thick canopies during the spring, global positioning system 1002 may be unable to provide accurate location information. In some cases, conditions may cause the location information provided by global positioning system 1002 to be less accurate than desired. For example, in a condition with a heavy canopy, the signal from a satellite to a global positioning system receiver is attenuated and more prone to multipath. Multipath results when a signal between a GPS satellite and a receiver follows multiple paths, typically caused by reflection from objects in the environment. These multiple signals can interfere with one another and the result may be phase shifting or destructive interference of the combined received signal. The signal corruption may result in a significant reduction in GPS position accuracy. In this situation, visible light camera 1012 and/or two dimensional/three dimensional lidar 1006 may be used to identify a location of the vehicle relative to non-mobile objects, such as curbs, light poles, trees, and other suitable landmarks.

In addition to receiving different perspectives of the environment, sensor system 1000 may provide redundancy in the event of a sensor failure, which facilitates high-integrity operation of the vehicle. For example, in an illustrative embodiment, if visible light camera 1012 is the primary sensor used to identify the location of the operator and visible light camera 1012 fails, radio frequency identification reader 1018 will still detect the location of the operator through a radio frequency identification tag worn by the operator, thereby providing redundancy for safe operation of the vehicle.

Figure 11:
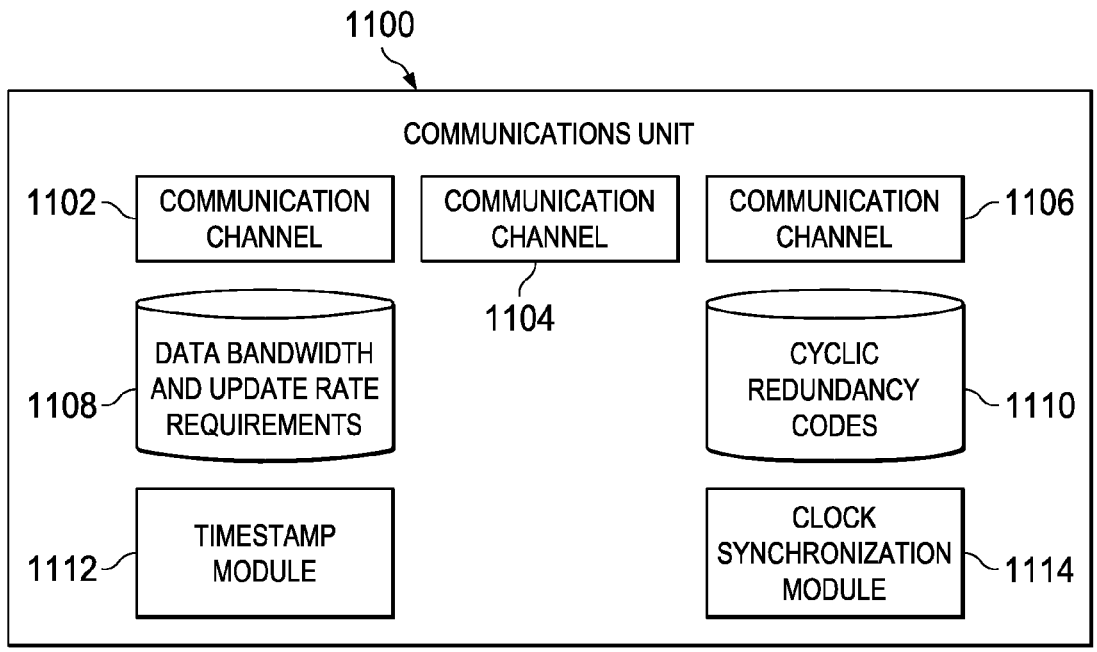
FIG. 11 is a block diagram of a communications unit in accordance with an illustrative embodiment.

With reference now to FIG. 11, a block diagram of a communications unit is depicted in accordance with an illustrative embodiment. Communications unit 1100 is an example of one embodiment of communications unit 812 in FIG. 8. Communications unit 1100 is also an example of one embodiment of communications system 712 in FIG. 7.

Communications unit 1100 may include communication channel 1102, communication channel 1104, communication channel 1106, data bandwidth and update rate requirements 1108, cyclic redundancy codes 1110, timestamp module 1112, and clock synchronization module 1114. Communication channels 1102, 1104, and 1106 are illustrative embodiments of heterogeneous channels across multiple frequencies. Communications unit 1100 may include multiple copies of each of communication channels 1102, 1104, and 1106 to provide redundant homogeneous channels. In an illustrative embodiment, examples of communication channels 1102, 1104, and 1108 may include, without limitation, AM radio frequency channels, FM radio frequency channels, cellular frequencies, satellite frequency channels, Bluetooth receivers, Wi-Fi channels, and Wi-Max channels.

Data bandwidth and update rate requirements 1108 contains information regarding the different communication bandwidths available to a particular vehicle, and the corresponding update rate for each of the different bandwidths. In an illustrative embodiment, for a particular coordinated behavior, certain pieces of information may need to be sent at a particular update rate when the vehicles are operating at a given speed. If the available bandwidth does not support the desired behavior and its data transfer needs, the behavior may be denied or the coordinated behavior may require execution at a slower speed so vehicle control can be maintained with the available lower update rate.

Cyclic redundancy codes 1110 is a data error checking means that receives as input a data stream of any length, and produces as output a value of a certain space, commonly a 32-bit integer. A cyclic redundancy code can be used as a checksum to detect alteration of data during transmission or storage. Cyclic redundancy codes are particularly good at detecting common errors caused by noise in transmission channels.

Timestamp module 1112 assigns a timestamp to data sets to ensure freshness for the applications which use the data for coordination. In one illustrative embodiment, the timestamp of the current stored data is compared to the timestamp of newly arrived data. The current data is only overwritten if the time stamp of the newly arrived data is more recent than the time stamp of the currently stored data. This overwriting of data is especially important if a store-and-forward network is used on a worksite and data may be delayed in traveling between vehicle A and vehicle B.

Clock synchronization module 1114 ensures that the computing means in each of the multiple controllable vehicles are synchronized with a common timing reference. Even when initially set accurately, real clocks will differ after some amount of time due to clock drift, caused by clocks counting time at slightly different rates. There are several methods of clock synchronization that are well known in the art.

Figure 12:
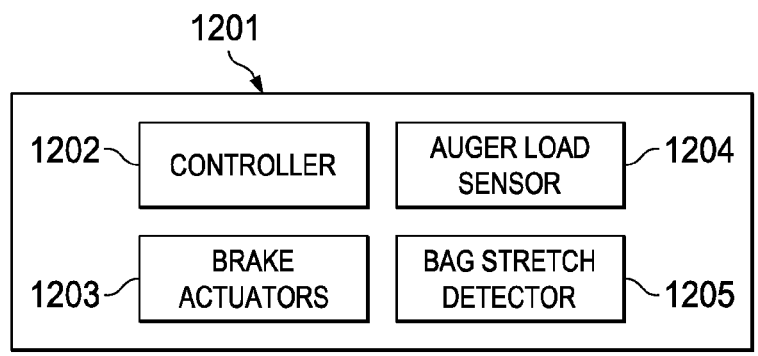
FIG. 12 is a block diagram illustrating a system for braking control in accordance with an illustrative embodiment.
Figure 13:
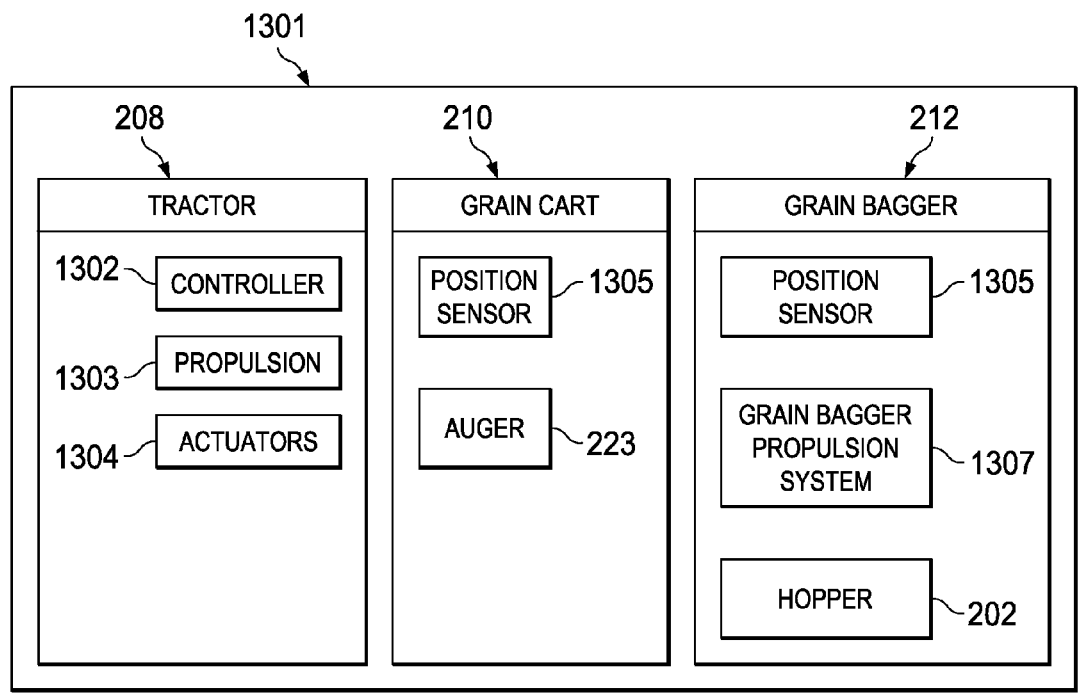
FIG. 13 is a block diagram illustrating a system for coordinated movement in accordance with an illustrative embodiment.
Figure 14:
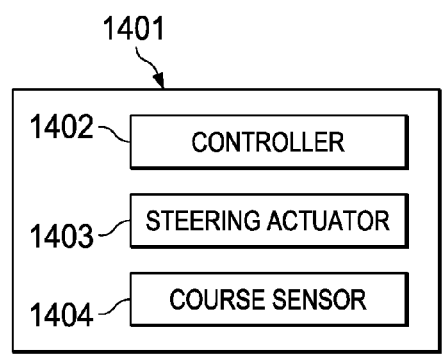
FIG. 14 is a block diagram illustrating a system for steering control in accordance with an illustrative embodiment.

With reference now to FIGS. 12-14 block diagrams show several illustrative embodiments of an intelligent bagging system that may include one or more processing features as described with regard to FIGS. 6-11. Referring first to FIG. 12, a block diagram of a bag stretch and braking system for use with grain bagger is depicted in accordance with an illustrative embodiment. While grain bagger 212, and other elements of FIG. 2 will be referred to with respect to the remaining Figures, it will be understood that other embodiments, even beyond those embodiments of FIGS. 2 and 3, may also be used with this description. In an illustrative embodiment, the system 1201 composes a computerized or partially computerized system which can further operate with computer program software. The system includes a controller 1202. The controller may be disposed on the grain bagger 212, or optionally, the controller may be positioned elsewhere (as on vehicle 208 with signals provided from controller to a receiver on grain bagger 212). Controller 1202 is connected to brake actuators 1203. Brake actuators 1203 control braking force applied to wheels 503 of grain bagger 506 in FIG. 5. In an illustrative embodiment, brake actuators 1203 include hydraulically controlled brake actuators 1203. Also included in the system of FIG. 12 is auger load sensor 1204. Auger load sensor 1204 detects a load which corresponds to the force/torque applied by stuffing auger 207 as it pushes grain into grain bag 225. This may be detected in several ways. For example, if stuffing auger 207 is belt driven, a belt tension may be detected as corresponding to auger load. If stuffing auger 207 of is hydraulically driven, a hydraulic pressure may be detected as corresponding to auger load. A torque sensor may detect torque on a mechanical drive associated with the auger. Alternatively, a pressure sensor may detect pressure of the grain in a position proximate to the exit of stuffing auger 207 as a measure of auger load. The auger load sensor 1204 provides measures of actual auger load to controller 1202.

Additionally, system 1201 includes a bag stretch detector 1205 in one embodiment. Bag stretch detector 1205 includes a sensor configured so as to measure actual bag stretch. Preferably, the bag stretch detector is positioned at some position downstream from the stuffing auger in an area where the bag undergoes stretch. Downstream in this sense refers to a position in the direction which grain is stuffed into bag 225. The detection point should be selected so as to correspond to that area on bag where stretch is taking place. The detection point should not be so far downstream that bag 225 is no longer stretching; nor should the detection point be selected too close to grain bagger 212 such that bag 225 is not stretching at that point.

In an illustrative embodiment, bag stretch detector 1205 may be an optical sensor in combination with markings. The detector may be a potentiometer that detects changes in resistance associated with movement of a detector. Additionally, the detector may be a strain gauge to measure physical stretching.

Those skilled in the art will appreciate that it is necessary to observe bag stretch at multiple points along the length of bag 225 fills. Thus, it is an illustrative embodiment to use an optical scanner or reader, positioned so as to read multiple sets of markings printed or placed on bag 225 as the bag unfolds from grain bagger 212. In this embodiment, the optical scanner may be placed at a set position on grain bagger 212, and it may be pointed or aimed at a position on grain bag 225 that is separated from grain bagger 212 by a sufficient distance so as to allow for the stretching and stuffing to occur. Thus, optical reader will take measurements at an appropriate location. Further, as the bag 225 fills and unfolds from grain bagger 212, multiple sets of marks will run out and pass the detection point of scanner. In this manner the optical reader can take multiple readings along the length of the bag as each marking passes in view of the scanner.

System 1201 is configured such that controller 1202 receives information from either or both of auger load sensor 1204 and bag stretch sensor 1205. Calling upon the features and systems described in FIGS. 6-11, controller 1202 determines and transmits an appropriate command signal to brake actuator 1203. While not specifically shown, it is to be understood that controller 1202 includes linkages between other components in system 1201.

With reference now to FIG. 13, a block diagram depicting a system for providing coordinated movement between the tractor and grain cart assembly and the independently moving grain bagger is described in accordance with an illustrative embodiment. System 1301 operates to provide coordinated movement. As vehicles, the system 1301 includes the grain bagger 212 of FIG. 2 and also includes a connected tractor 208 and grain cart 210 assembly as shown in the embodiment of FIG. 2. The tractor 208 is configured so as to pull the grain cart 210 in order to maintain the auger 223 of grain cart 210 in the loading position with respect to grain bagger's hopper 202. The system includes controller 1302. The tractor propulsion system 1303 also includes actuators 1304 such as velocity control, braking control, and steering control. The system includes a position sensor 1305 which detects the relative position of auger 105 of FIG. 1 and hopper 202 of FIG. 2. Sensor 1305 may be positioned on auger, on hopper or both.

In an illustrative embodiment, the position sensor detects the distal end 201 of auger 223, where the grain 204 is unloaded, as to the upper surface of hopper/funnel. In various illustrative embodiments, the position detector may be an optical reader, an electrical field detector, or a mechanical/spring detector. In an illustrative embodiment, the detector can detect the relative position of the auger with respect to the hopper opening in both X and Y coordinates, relative to the ground surface. This information can then be used to determine whether the velocity of the distal end 201 of the auger 223 needs to be accelerated or retarded, or whether turning of the tractor 208 needs to maneuver the auger 223 to the left or right relative to the grain bagger 212. Further components of the coordinated movement system include a ground speed detector.

In an illustrative embodiment, controller 1302 is disposed on tractor 208; however, controller 1302 may be placed elsewhere and may be distributed among multiple locations. In an illustrative embodiment of coordinated movement, grain bagger 212 proceeds at its pace, dictated by the progress of the bagging operation as heretofore described. Tractor 208 receives information as to the perceived location of auger 223 and hopper 202, and controller 1302 controls the manner in which tractor 208 pulls grain cart 210 so as to maintain the loading position between the auger 223 and hopper 202.

In a further embodiment, grain bagger 212 or similar vehicle may further comprise a grain bagger propulsion system 1307 such as elements that may include an engine, transmission, and gearing. Alternatively, a force to drive the grain bagger propulsion system may be drawn from prime mover 206 previously described as providing the mechanical energy by which grain bagger performs its bagging functions. A control system for the grain bagger propulsion system 1307 may also be included. Both the sensors and the control system may be configured similarly to other sensor and control systems described herein with respect to other embodiments. Grain bagger 212 has previously been described wherein the force of stuffing grain into a grain bag provides the force which propels or urges grain bagger 212 in a forward movement. However, in alternative embodiments, grain bagger 212 may also include a separate propulsion system 1307 for independently propelling grain bagger 212.

Referring now to FIG. 14, a block diagram of a grain bagger steering system is depicted in accordance with an illustrative embodiment. The steering system 1401 includes a controller 1402. As with the system in FIG. 14, the controller 1402 may be disposed on the grain bagger 107 of FIG. 1 or may be positioned elsewhere. The system includes a steering actuator 1403 connected to the controller 1402 for turning the grain bagger 107 to the left or to the right. Additionally, the system includes course sensor 1404, also connected to the controller, for detecting the course of grain bagger.

Those skilled in the art will also appreciate that the grain bagging system may be configured and applied in further embodiments different from the specific grain bagging systems previously described. For example, a general application of a grain bagging operation includes a first mobile device or vehicle which transfers matter into a second mobile device or vehicle. The first and second device or vehicle will be referred to as a vehicle, though it will be appreciated that each may also comprise a device. The second vehicle may provide for bagging of the matter received from the first vehicle. Alternatively, the bagging may include, or be substituted for, consolidation of material. The bagging and/or consolidation of material in the second vehicle may provide an input force which affects the mobility of the second mobile vehicle. The affects of the mobility of the second vehicle includes both speed and direction of the vehicle. The speed and direction of the second vehicle may be controlled. Additionally, the relative positioning of the first vehicle with respect to the second vehicle may be controlled so as to effectuate transfer of material from the first vehicle to the second vehicle.

While the material described herein for bagging has frequently been described as grain, other kinds of materials may also be included in the transferring and bagging operations. For example, other organic materials may be included such as haylage, silage, corn cobs, and other biomass. Also, composting materials may be included such as leaves and grass. Wood chips and saw dust could also be included as material subject to transfer and bagging. Additionally, sand, gravel or other inorganic matter could also be included in an automated bagging operation.

The bag has also been described, both in its description and usage, as is generally used in grain storage operations. However, the bag may be configured for other kinds of bagging applications and operations. For example, the bag may be smaller in size or dimension such that the bag may be portable or even carried by another machine. Additionally, the bag may be air tight so as to enable anaerobic fermentation of the bag contents. In another case, the bag may be made permeable to water vapor and impermeable to liquid water such that the material within the bag could dry without being rewetted by rain and snow.

Other specific features of the previously described grain bagging systems and embodiments may also be incorporated into the general grain bagging system. For example, a second vehicle may further include a propulsion system, sensors, and a control system for the propulsion system. The sensors may provide information to the control system. Further, the sensors may receive information related to the course and/or speed and/or position of the second vehicle. In response to a sensed signal, the control system may adjust the propulsion system so as to adjust the course and/or speed of the second vehicle.

Thus, by way of example only, further embodiments of a general bagging system may also include automated transfer from a first vehicle to a second vehicle, and bagging of the material in the second vehicle, wherein the material may include lawn clippings, grass, mowing product, leaves, haylage, silage, biomass, corn cobs, organic matter, sand, gravel, and inorganic matter.

Figure 15:
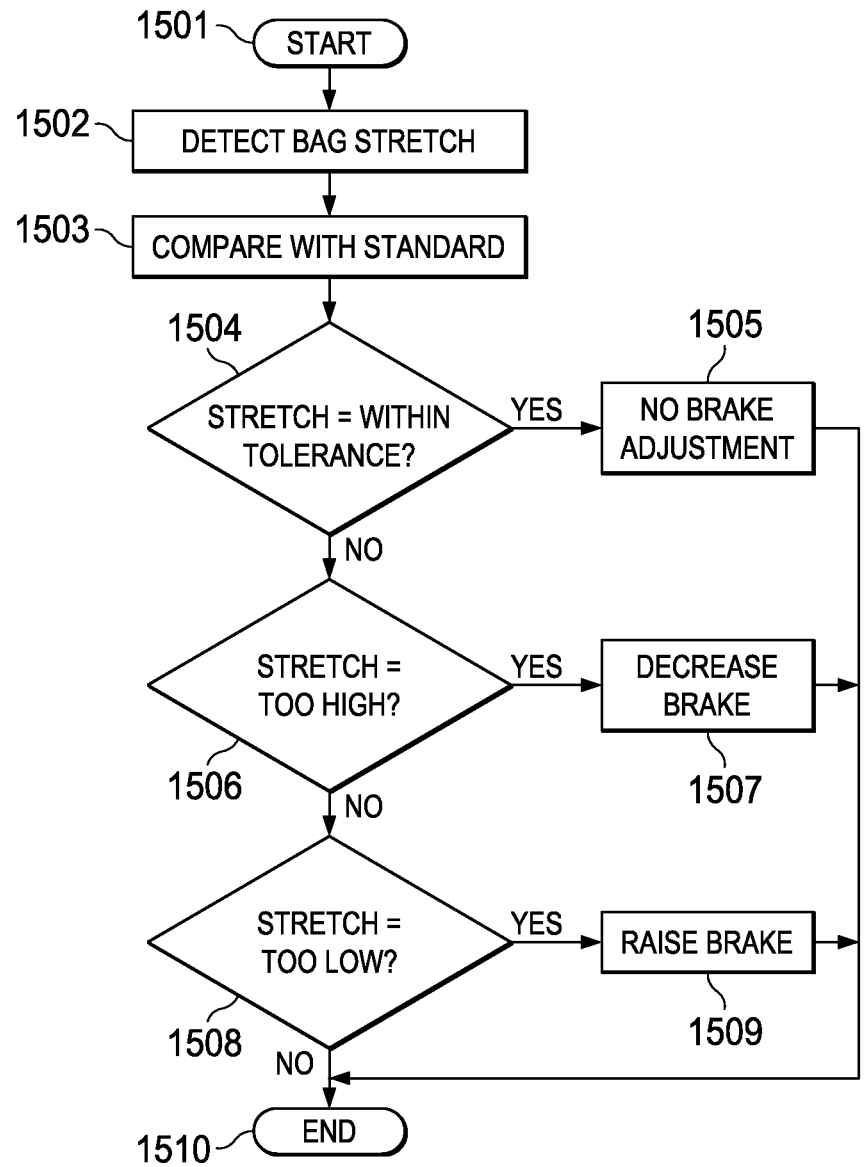
FIG. 15 is a flowchart illustrating a process for braking control in accordance with an illustrative embodiment.

Having described various illustrative embodiments of the invention from a structural standpoint, a method of using the system will now be described. With reference now to FIG. 15, a flowchart illustrating a process for braking control of bagging unit is depicted in accordance with an illustrative embodiment. The process in FIG. 15 may be implemented by software in conjunction with a computer, such as machine controller 802 in FIG. 8.

The process begins at START (step 1501) which may be, for example, a power up command, or a routine initiation. A self-test step (not shown) may be executed to ensure onboard systems are running. The system detects bag stretch (step 1502). An indication of bag stretch is provided by one or more sensors observing bag stretch. Bag stretch sensing may be provided by, for example, optical or visual scanners, tension detectors, or potentiometers. The process may further include translation routines where observed physical phenomena such as distance, force, or resistance are translated into the corresponding stretch data unit or other desired unit. Additionally, the process may include an averaging or smoothing function wherein individual sensed data points are averaged or smoothed with similar data in order to remove anomalous spikes from an overall data set. Further, the bag stretch may be detected at a single location or multiple locations on bag.

In an illustrative embodiment, the bag stretch measurement 1502 is taken at a set lateral length (along the lengthwise axis of bag) away from the stuffing auger as this is the location at which the bag is undergoing dynamic stretch. Farther down the length of the bag, the bag has already stretched. Closer in from this position, the bag has not yet been stuffed enough to provide any useful stretching data.

The bag stretch detected in step 1502 is then compared to a bag stretch standard (step 1503). A bag stretch standard represents a desired level of bag stretch so as to optimize the grain bag's carrying capacity without overstretching the bag. This parameter may depend on the physical construction of the bag such as thickness and elasticity. Additionally, the compressibility of the grain may also factor into a desired stretch standard.

A series of testing steps and corresponding functional actions now follow. If the detected stretch is within the tolerance of the standard (step 1504), then no braking adjustment is called for (step 1505). This level of stretch indicates that the bag is displaying a level of stretch within tolerance. If the detected stretch is too high (step 1506); i.e., is higher than the standard, then the system generates a signal to decrease braking power (step 1507). A too high signal indicates that the bag is overstretching. Thus, by decreasing the braking power to the brakes it allows the bagging unit to be moved forward more easily, thus decreasing the stretching force on the bag. If the detected stretch is too low (step 1508); i.e., the detected stretch is lower than the standard, then the system generates a signal to increase braking power (step 1509). A too low bag stretch indicates that not enough grain is being stuffed into the bag. By increasing braking strength, the bagging unit is held more in place, giving more resistance to the bag and thereby allowing more grain to be stuffed into the bag so as to cause it to stretch further.

At this point, the routine ends (step 1510). However, the routine of FIG. 15 can be repeated multiple times, such as periodically repeated every defined unit of time, in order to maintain a continuous monitoring of bagging stretch.

The process described in FIG. 15 may further include predictive process control smoothing techniques wherein brake adjustments are made just prior to the stretch data falling out of a desired limit. For example, a series of increasing stretching signals over a period of time may signal that braking adjustments are made immediately rather than waiting for the signal to fall outside of the limit. This is done because the physical effect of decreased braking will experience a time delay such that the braking effect will not show up in the overall system for a further unit of time. If the braking were delayed, after that further unit of time, the stretch would have fallen outside of its limit.

Figure 16:
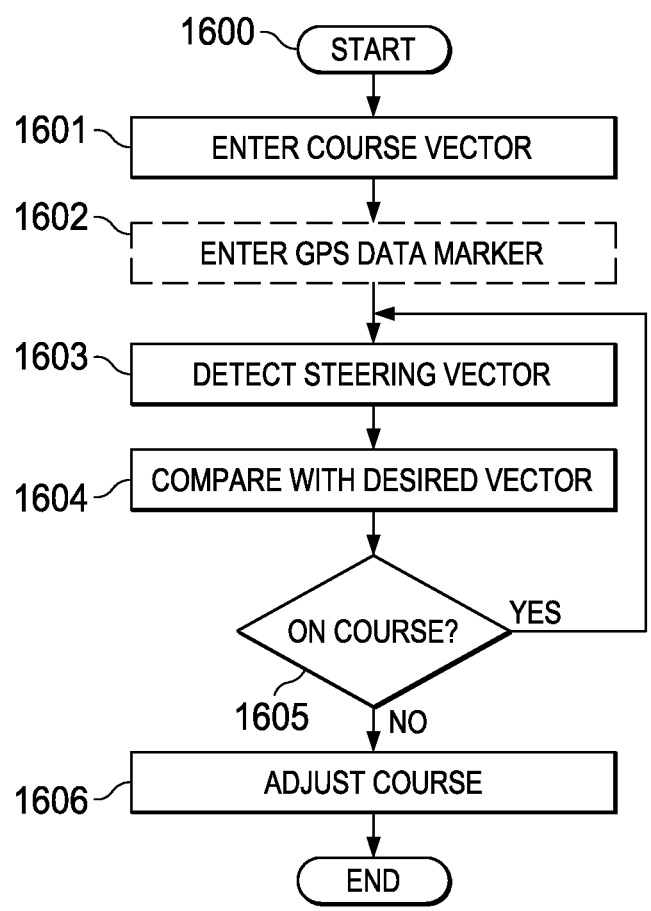
FIG. 16 is a flowchart illustrating a process for steering control in accordance with an illustrative embodiment.

With reference now to FIG. 16, a flowchart illustrating a process for steering control of bagging unit is depicted in accordance with an illustrative embodiment. The process in FIG. 16 may be implemented by software in conjunction with a computer, such as machine controller 802 in FIG. 8.

The process begins at START (step 1600) which may be, for example, a power up command, or a routine initiation. A self-test step (not shown) may be executed to ensure onboard systems are running.

In one illustrative embodiment, a course vector is entered into the system (step 1601). Course vector corresponds to a desired course or path that the grain bagger is desired to follow. In practical operation of the process, a grain bagger must travel up to a few hundred feet in order to completely fill a grain bag. Thus, a course vector may provide an acceptable course (open and clear of obstructions) for that distance. Optionally, a GPS (global positioning satellite system) data marker can be input (step 1602). Again, if it is desired that the grain bagger travel a few hundred feet in order to fill the grain bag, a GPS way point or data marker can be selected on a line along the desired path of travel at some farther distance. For example, a GPS way point a mile distant on the desired path of travel can be selected and input. In further steps of the process, the grain bagger would tend to travel toward the way point, and would necessarily follow the desired path for the few hundred feet it is necessary to fill the grain bag. Other options, not shown in the process, include providing a radio signal transmitter or providing a visual marker (such as a ground stake) each with a desired course of travel.

Figure 17:
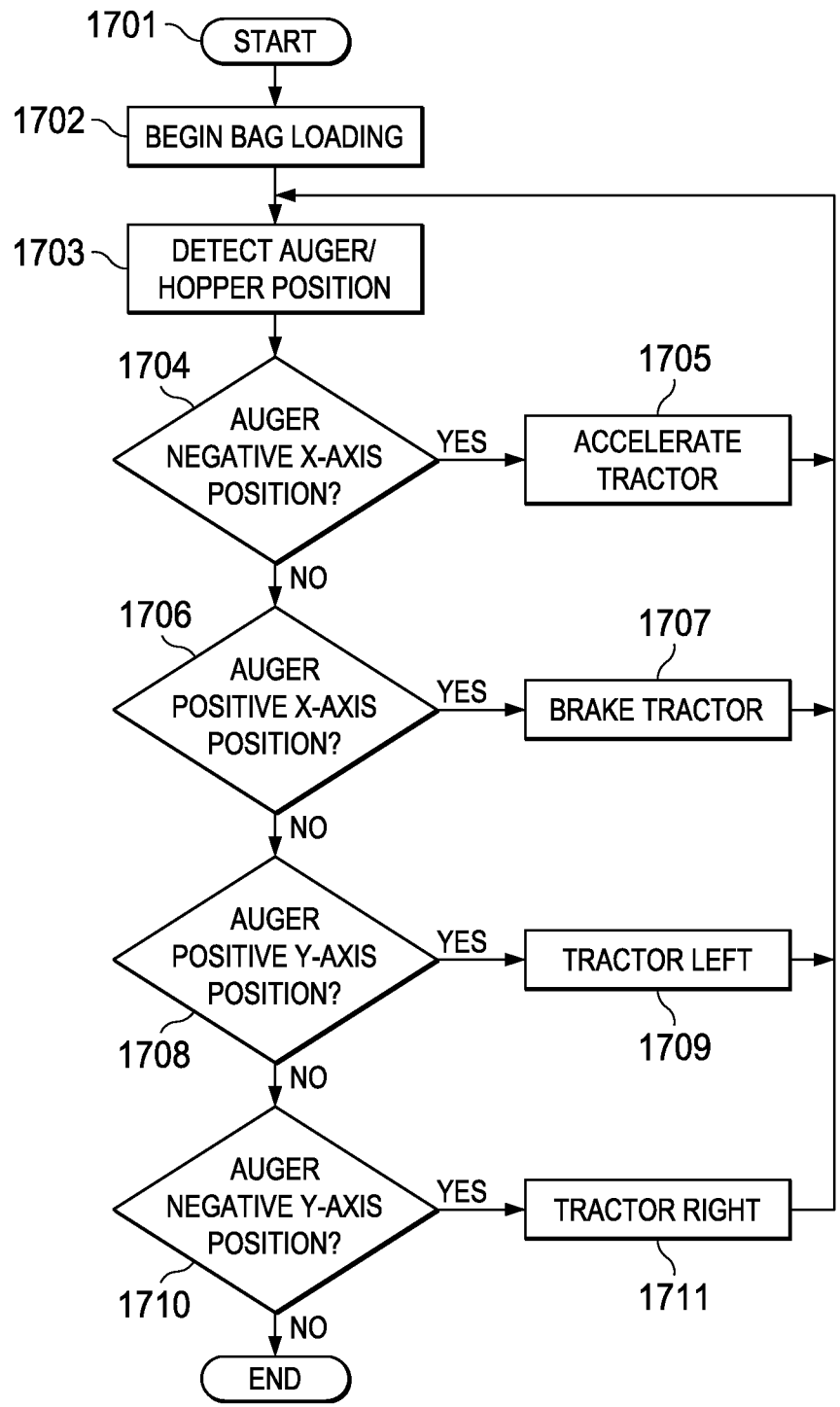
FIG. 17 is a flowchart illustrating a process for coordinated control of movement in accordance with an illustrative embodiment.

The process detects an actual steering vector (step 1603). The detection can be from one of the methods previously described such as, by way of illustrative example only, visual detection of a marker, inertial course detection, radio signal detection, or GPS signals. The actual steering vector detected in step 1603 is then compared with the desired course vector (step 1604). This data comparison is evaluated (step 1605). If the actual detected course is on course (or within a desired tolerance), no steering change is indicated. And, the process may return to the step of detecting an actual steering vector (step 1603). However, if the actual detected course is off course; i.e., the detected course differs from the entered course vector by some defined degree, then a steering adjustment is provided (step 1606). A steering adjustment may be a left turn actuation or a right turn actuation depending on the desired correction. The comparison step 1604 may further indicate that the vehicle has fallen off the desired course vector either to the left or to the right. As desired, the process of FIG. 16 can be repeated in order to maintain a continual course correction procedure. Referring now to FIG. 17, a flowchart illustrating a method to control the coordinated movement of a tractor and grain cart with respect to a grain bagger is depicted in accordance with an illustrative embodiment. An iterative, repeatable process, which may be implemented by software in conjunction with a computer, such as controller 802 as shown in FIG. 8 begins with step 1701. The grain bagger 212 begins to load grain in an associated grain bag 108 (step 1702). In the process of the illustrative embodiments, an engine or prime mover 206 disposed on grain bagger 212 provides mechanical energy (or other forms of energy) so as to stuff grain from hopper 202 into grain bag 225. In an illustrative embodiment, a stuffing auger transfers the grain into grain bag 225. The act of filling the grain bag (step 1702) provides a motive force which begins to push grain bagger 107 in FIG. 1 in a forward direction. As previously described, the forward movement of grain bagger 212 in FIG. 2 is controlled by braking and steering control. In this manner, the loading of grain bag (step 1702) allows grain bagger 212 to proceed in a desired course, which will generally be a straight course so as to allow grain bag 225 to fill with minimal kinks or contortions which may affect the carrying volume of grain bag 225. A sensor detects the relative position of auger 223 and hopper 202, and in an illustrative embodiment the position of distal end 201 of auger 223 and hopper 202 is detected (step 1703). As previously described, the sensor may detect the relative positions using any of the various sensing equipment. The detection determines the position of distal end 201 of auger 223 with respect to an XY plane. As further described herein, this will allow for backwards/forwards and left/right control. Sensor information regarding the position of auger 223 and hopper 202 is provided to a controller 221 which interprets the information in the following series of steps. In one step the system determines whether the auger 223 is in a negative X-axis position with respect to the hopper (step 1704). This is the equivalent of the distal end 201 of the auger 223 falling behind with respect to the hopper 202 because the grain cart 210 is moving too slowly. Alternatively, the query could be such so as to determine whether the auger 223 is in a negative position with respect to a predetermined loading position. If the response to that query is yes, then the system generates the command to adjust the tractor position. In this case, the tractor 208 accelerates (step 1705). It is the tractor 208 that accelerates as it is the tractor 208 that generally pulls and controls the position of grain cart 210. Thus the grain cart 210 is accelerated, and likewise the auger 223 attached to the grain cart 210 is accelerated.

In a further step, the controller determines whether the auger 223 is in a positive X-axis position with respect to the hopper 202; i.e., the grain cart 210 is going too fast (step 1706). If the response to this query is yes, the system generates a command to brake the tractor 208 and thereby retard the movement of the grain cart 210 and auger 223 (step 1707).

In a further step, it is determined whether the auger 223 is in a positive Y-axis position with respect to the hopper 202; i.e., the hopper 202 is too far right (step 1708). If so, the tractor 208 is turned to the left so as to move the grain cart 210 (and auger 223) to the left (step 1709).

In a still further step, it is determined whether the auger 223 is in a negative Y-axis position with respect to the hopper 202; i.e., the auger 223 is too far left (step 1710). If the response is yes, the tractor 208 is turned right (step 1711) so as to move the grain cart 210 and auger 223 to the right. In each of the above steps, the corrective step seeks to maintain the grain cart 210 in the loading position as between the distal end 201 of auger 223 and hopper 202.

The method described in FIG. 17 relates to the coordinated movement of tractor 208 and grain cart 210 such that, while grain bagger 212 is in motion, the grain cart 210 is maintained in the loading position with respect to grain cart 212. However, it should also be pointed out that the coordinated movement system and method can be used during pre-loading operations, such as when the grain bagger 212 is in a static, non-loading position. In such a situation, the grain cart 210 can be maneuvered, via the tractor 208, so as to first place distal end 201 of auger 223 into the loading position with respect to the hopper 202. For example, the system can provide positioning signals as to whether auger 223 is in the positive or negative position, with respect to the X and Y axes, and can be moved accordingly, when grain bagger 212 is not moving. Once that loading position has been achieved, then loading of the grain bag 225 along with movement of grain bagger 212 can be initiated. Then dynamic coordinated movement, the method of FIG. 17, can come into place.

In a further illustrative embodiment, the various systems and features of the intelligent grain loader are configured and positioned such that a single operator, positioned within tractor 208 can, after initial set up work, initiate and manage the grain bagging operation. Initial set up work, which may be done outside the tractor, may include attachment of the grain bag to the grain bagger. It could also include the positioning of any external position markers, if used. It could also include the attachment of tractor to grain cart.

As just described, the operator can first position the auger in the loading position while positioned in the tractor. Also, for example, the engine 504 on grain bagger 212 can have a remote starting and stopping functionality such that the operator can start the engine while positioned in the tractor. The start up of the engine would then initiate grain transfer into the grain bag. Additionally, the operator can enter desired course or path information as to the grain bagger while positioned in the tractor. In this manner, a single operator can manage the grain bagging operation thus freeing several other workers to undertake other tasks.

Figure 18:
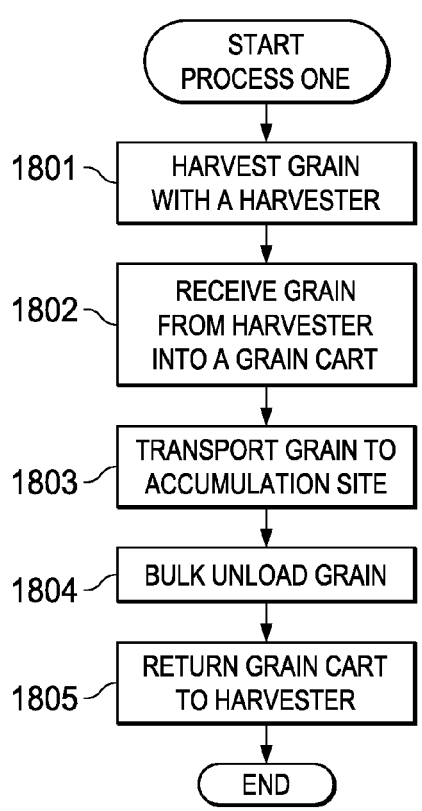
FIG. 18 is a flow chart illustrating a method for grain cart cycling according to an illustrative embodiment.

Referring now to FIG. 18, a flowchart illustrating a method for grain cart cycling is depicted in accordance with an illustrative embodiment. The process depicted in FIG. 18 may be performed in conjunction with embodiments as shown in FIGS. 2 and 5. Further, the process may proceed as described with respect to the time intervals depicted in FIG. 4.

The process of grain cart cycling begins with harvesting a crop such as grain with a harvester 224 (step 1801). As the harvester 224 completes the harvesting, the crop product such as grain 204 is stored in the harvester's integral storage tank. The rapidity in which the harvester's storage tank will fill depends on a number of factors such as crop yield, the kind of crop, terrain, weather, and harvester speed.

The position of harvester 224 may be referred to herein as a harvesting location 299. As harvester 224 moves through a crop or field, the harvesting location 299 will also move. Harvesting location 299 is thus not necessarily a static location. Thus, ancillary vehicles as described further herein, proceed to harvesting location 299 to meet harvester 224 in order to receive grain or crop product from harvester 224.

In a further step, crop product from harvester 224 is transferred into bulk unloading grain cart 271 (step 1802). In one embodiment of step 1802, the transfer of grain from harvester 224 to bulk unloading grain cart 271 is performed using an auger or other transfer equipment disposed on or included with harvester 224. The bulk unloading grain cart 271 need not include an additional auger or transfer device. In this manner, capital equipment on the bulk unloading grain cart 271 is minimized and a savings can be realized. The bulk unloading grain cart 271 need not carry an auger or the machinery needed to unfold and position the auger or to power the auger. Typically an auger is powered by some mechanical means, such as a belt drive taken from a tractor PTO. Additionally, an auger must typically be moved and positioned. This movement and positioning includes unfolding the auger and moving it into a position such that the auger receives grain at one end and transfers the grain at the other end in a desired location. After use, the auger is folded back into a storage position. The movement and positioning of the auger is typically performed by hydraulic actuation. With respect to a grain cart, again the power source for hydraulic actuation often comes from the hydraulic system of an attendant tractor. In the presently described configuration, a bulk unloading grain cart has no need for the expensive machinery associated with an auger and its ancillary equipment.

In a further step, the bulk unloading grain cart 271, now laden with grain, transports the grain from the harvester 224 to the accumulation site 291 (step 1803). This may be performed by towing the bulk unloading grain cart by another vehicle. Those skilled in the art will further recognize that the towing vehicle may now be any vehicle such as, for example, a pickup truck. There is no need for the towing vehicle to also provide the additional functionality of a PTO or hydraulic power to the bulk unloading grain cart 271.

In a further step, the bulk unloading grain cart 271 bulk unloads its load of grain at an accumulation site 291 (step 1804). The bulk unloading may be accomplished through a number of processes and with a number of different equipment. The bulk unloading may comprise a gravity dump, a quick unloading which advantageously uses potential energy due to the elevated position of the grain in the bulk unloading grain cart relative to a lower position. The gravity dump may be through a rear dump, a side dump, or bottom dump configured in the bulk unloading grain cart. Alternatively, the gravity dump may include overturning the cart so as to allow the grain to fall through the opening in the top of the grain cart.

The machinery and equipment used to enable the bulk unloading of step 1804 may also include a number of different kinds of equipment. For example, the bulk unloading grain cart 271 may include quick release doors, windows, or gates that allow a quick gravity dumping of granular crop product. The bulk unloading grain cart 271 may further include a number of hydraulic piston and cylinder sets with additional hydraulic equipment configured so as to elevate a bed or portion of the cart in order to achieve gravity dumping. Moveable doors or gates such as hinged doors or sliding doors may further be employed.

The bulk unloading grain cart 271 may, but does not necessarily, differ in configuration when compared with the previously described grain cart 210. Grain cart 210 may include the auger and related equipment in order to achieve the grain transfer into the hopper 202 of grain bagger 212. As just described, bulk unloading grain cart 271 does not need this equipment. Further, grain cart 210 need not include a configuration for bulk unloading, but may have such. However, the flexible configuration of bulk unloading grain cart 271 does allow an operator to save in capital by omitting unnecessary items of equipment.

Bulk unloading deposits grain at an accumulation site 291. An accumulation site 291 is any location where a crop product may be bulk unloaded. A simple form of accumulation site 291 is a grain pile positioned on the ground. Liners, containers, bins, hoppers, and other forms of equipment may also be used in conjunction with the accumulation site. The accumulation site 291 may be on the ground, above ground, or below ground. Additionally, the accumulation site 291 may include bulk carriers such as grain bins, mobile grain bins, hoppers, grain trucks, and bulk grain railcars.

In a further step, bulk unloading grain cart 271 returns to the harvesting location 299 and harvester 224 (step 1805). Bulk unloading grain cart 271 may do this in order to receive a further load of grain, and thereby begin the process of FIG. 18 again at step 1802.

A further advantage of the illustrative embodiment of the grain unloading and bagging method is here mentioned. As just described, bulk unloading grain cart 271 engages in a cycle or circuit of grain receiving, grain transporting, bulk unloading, and returning. Quickness in movement is therefore desired. In other embodiments, a tractor, a relatively slow moving vehicle, is employed to tow a grain cart. Bulk unloading grain cart 271 need not be towed by a tractor, having no need for the mechanical or hydraulic functionality of the tractor, but instead may be towed by a truck, a vehicle capable of relatively quicker movement. A truck may be able to tow bulk unloading grain cart 271 more quickly than a tractor, especially when longer travel distances are encountered, thereby increasing the overall speed and efficiency of the grain harvesting and bagging operation.

Figure 19:
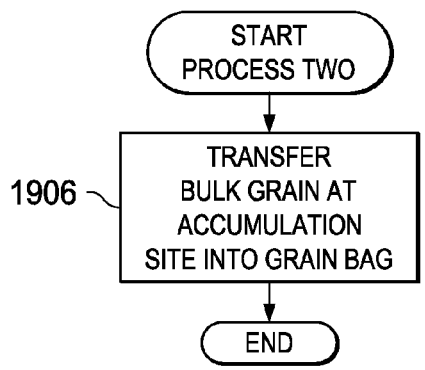
FIG. 19 a flow chart illustrating a grain bagging process that may take place in parallel with the method depicted in FIG. 20, according to an illustrative embodiment.

Referring now to FIG. 19, a flowchart showing a grain bagging process is depicted. In a further step, the grain or crop product at accumulation site 291 is transferred into a grain bag (step 1906). Step 1906 is depicted in FIG. 19; however step 1906 can take place as a parallel process with respect to the steps shown in the process of FIG. 18. Step 1906 may also proceed in similar fashion as previously described with respect to the embodiments of FIGS. 2 and 5 with the following difference.

As previously described, for example with respect to the illustrative embodiment of FIG. 2, a grain cart 210 contains grain and that grain is transferred to a grain bagger 212 for loading into a grain bag 225. At step 1906, grain is positioned at an accumulation site which may be, but need not be, a grain cart. If, for example, grain at accumulation site is in the form of a grain pile, the grain may be loaded directly into a grain bagger hopper.

Alternatively, the grain in a grain pile may be loaded into a grain cart which attends a grain bagger as previously described. The loading from a grain pile into a grain cart may take place by any suitable means such as, for example, use of a bulk mover such as a front end loader.

The transferring step 1906 is described as a parallel process, but may also take place in another configuration. Transferring step 1906 may take place in series with respect to the other steps of FIG. 18.

Figure 20:
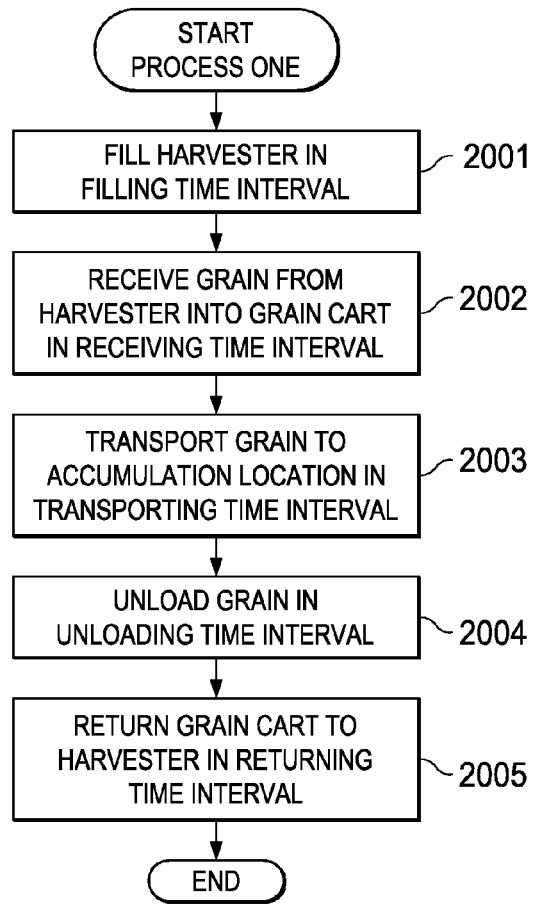
FIG. 20 is a flow chart illustrating a method for grain cart cycling according to an illustrative embodiment.

Referring now to FIG. 20, a flowchart illustrating a method for grain cart cycling is depicted in accordance with an illustrative embodiment. The method depicted in FIG. 20 may be performed in conjunction with a system such as depicted in FIG. 2. In one step, a harvester 224 is filled in a filling time interval (step 2001). Filling time interval is that interval of time it takes to fill the holding tank integral in the harvester 224.

In a further step, grain from the harvester holding tank is received into a bulk unloading grain cart 271 in a receiving time interval (step 2002). The receiving time interval is that interval of time it takes to transfer grain from the harvester holding tank into the bulk unloading grain cart 271.

In a further step, the bulk unloading grain cart 271 transports the received grain to accumulation location 291 in a transporting time interval (step 2003). Thus, the transporting time interval is that period of time it takes the bulk unloading grain cart 271 to move from the harvester 224 to the accumulation location 291.

In a further step, the bulk unloading grain cart 271 bulk unloads the grain at the accumulation location 291 in an unloading time interval (step 2004). The unloading time interval is that period of time it takes to bulk unload the grain at accumulation location 291.

In a further step, the now unloaded bulk unloading grain cart 271 returns to the harvester 224 in a returning time interval (step 2005). The returning time interval is that period of time it takes the bulk unloading grain cart 271 to move from the accumulation location 291 to the harvester 224.

Figure 21:
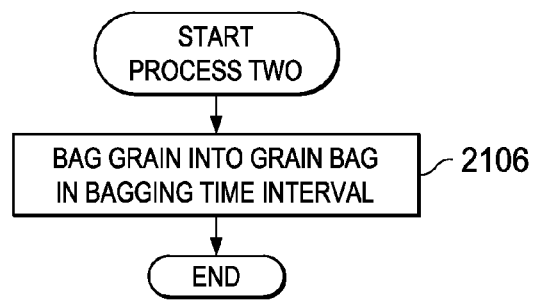
FIG. 21 is a flow chart illustrating a grain bagging method in accordance with an illustrative embodiment.

Referring next to FIG. 21 a flow chart illustrating a grain bagging method is depicted in accordance with an illustrative embodiment. In a further step, grain at the accumulation location 291 is placed into a grain bag 225 in a bagging time interval (step 2106). The step of placing grain into the grain bag 225 may take place as a parallel process with respect to the other steps of the process shown in FIG. 20. The bagging time interval is that period of time it takes to bag the volume of grain that was dumped by the bulk unloading grain cart 271 in the bulk unloading step 2004. Further, bagging step 2006 may proceed as previously described herein such as with respect to FIGS. 2 and 3.

Turning now to a discussion of FIG. 20, the method may be configured so as to employ a single cart or a multiple cart cycle. For example, when the receiving interval of time is greater than the sum of the transporting interval of time, the unloading interval of time, and the returning interval of time, then a two cart system is called for. A first cart engages in receiving while the second cart is transporting, unloading, and returning.

In another configuration, the filling interval of time is less than the sum of the transporting interval of time, the unloading interval of time, and the returning interval of time. In that configuration, a single grain cart may be used to attend the harvester. One grain cart provides transport from the harvester to and from the accumulator with bulk unloading while the harvester fills. In such a situation, the integral grain tank of the harvester would have to have sufficiently large capacity such that the filling interval of time allows for the other activities.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method for managing the movement and storage of grain using a data processing system comprising a processing device and memory, the method comprising the steps of:
   transporting grain in a grain cart from a harvesting location to an accumulation site;
   unloading the grain from the grain cart at the accumulation site to form unloaded grain;
   returning the grain cart to the harvesting location; and
   transferring the unloaded grain from the accumulation site into a grain bag, wherein the step of transferring the unloaded grain from the accumulation site into the grain bag further comprises:
   loading grain into the grain bag attached to a grain bagging unit, the loading thereby providing a propelling force and stretching force to the grain bagging unit;
   responsive to stretching of the grain bag information, the data processing system controlling braking of the grain bagging unit;
   responsive to sensed course of the grain bagging unit information, the data processing system controlling steering of the grain bagging unit;
   sensing relative positions of a grain transferor and a receiving hopper so as to obtain a sensed relative position;
   responsive to the sensed relative position, the data processing system controlling a position of the grain cart and a tractor assembly relative to the grain bagging unit such that the grain transferor connected to the grain cart maintains a loading position with respect to the receiving hopper disposed on the grain bagging unit; and
   loading grain from the grain cart through the transferor into the receiving hopper.

2. The method of claim 1 wherein the step of unloading grain further comprises bulk unloading of the grain from the grain cart.

3. The method of claim 2 wherein the step of bulk unloading is selected from the group consisting of bottom dumping, side dumping, and rear dumping from the grain cart.

4. The method of claim 1 wherein the step of unloading grain further comprises unloading the grain on the ground.

5. The method of claim 1 wherein the step of unloading grain further comprises unloading the grain below ground.

6. The method of claim 4 further comprising a liner positioned between the grain and the ground.

7. The method of claim 1 wherein the step of unloading the grain further comprises unloading grain into a bin selected from the group consisting of: a storage bin, a mobile storage bin, a hopper, a truck grain bin, and a grain rail car.

8. The method according to claim 1 wherein the grain cart further comprises a bulk unloading grain cart.

9. The method of claim 8 further comprising transferring the grain into the bulk unloading grain cart from a grain harvester utilizing grain transfer equipment positioned in the harvester.

10. The method of claim 9 wherein the bulk unloading grain cart is characterized by not having an auger.

11. The method of claim 9 wherein the transfer equipment comprises an auger.

12. The method of claim 8 wherein the step of unloading further comprises rear gravity dumping from the bulk unloading grain cart, and wherein the bulk unloading grain cart comprises a hydraulic piston and cylinder.

13. The method of claim 8 wherein the bulk unloading grain cart further comprises at least one from the group consisting of a gate, a door, a sliding door, and a window.

14. A method for managing crop harvesting and crop bagging using a data processing system comprising a processing device and memory, comprising:
- transporting a crop product in a cart from a harvester to an accumulation site;
- bulk unloading the crop product from the cart at the accumulation site;
- returning the cart to the harvester; and
- transferring the crop product from the accumulation site into a bag;
- wherein a first process comprises transporting the crop product, bulk unloading the crop product, and returning the cart;
- wherein a second process comprises transferring the crop product from the accumulation site into a bag;
- wherein the first process and second process proceed in parallel, wherein the step of transferring the crop product from the accumulation site into the bag further comprises:
- loading the crop product into a bag attached to a bagging unit, the loading thereby providing a propelling force and stretching force to the bagging unit;
- responsive to stretching of the bag information, the data processing system controlling braking of the bagging unit;
- responsive to sensed course of the bagging unit information, the data processing system controlling steering of the bagging unit;
- sensing the relative positions of a crop product transferor and a receiving hopper so as to obtain a sensed relative position;
- responsive to the sensed relative position, the data processing system controlling a position of a crop product loading cart and tractor assembly relative to the bagging unit such that the crop product transferor connected to the crop product loading cart maintains a loading position with respect to the receiving hopper disposed on the bagging unit; and
- loading the crop product from the crop product loading cart through the transferor into the receiving hopper.

* * * * *